(12) United States Patent
Yao et al.

(10) Patent No.: US 6,721,490 B1
(45) Date of Patent: Apr. 13, 2004

(54) HIERARCHICAL STORAGE SCHEME AND DATA PLAYBACK SCHEME FOR ENABLING RANDOM ACCESS TO REALTIME STREAM DATA

(75) Inventors: Hiroshi Yao, Tokyo (JP); Hirokuni Yano, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/409,424

(22) Filed: Sep. 30, 1999

(30) Foreign Application Priority Data

Sep. 30, 1998 (JP) .......................... P10-278081
Dec. 25, 1998 (JP) .......................... P10-368932

(51) Int. Cl.⁷ ............................... H04N 5/783
(52) U.S. Cl. .................. 386/69; 386/70; 360/72.1; 360/77.2
(58) Field of Search ................ 386/4, 6–8, 45, 386/52, 55, 64, 69–70, 125–126; 345/328; 360/72.1, 72.2; 369/30–41, 44.28; 348/700, 701, 702; H04N 5/76, 5/781, 5/91, 5/92, 9/79

(56) References Cited

U.S. PATENT DOCUMENTS

| | | | | |
|---|---|---|---|---|
| 5,047,867 A | * | 9/1991 | Strubbe et al. | 386/83 |
| 5,179,449 A | * | 1/1993 | Doi | 386/52 |
| 5,488,409 A | * | 1/1996 | Yuen et al. | 386/83 |
| 5,576,950 A | * | 11/1996 | Tonomura et al. | 386/95 |
| 5,613,032 A | * | 3/1997 | Cruz et al. | 386/69 |
| 5,727,060 A | * | 3/1998 | Young | 386/83 |
| 5,832,523 A | | 11/1998 | Kanai et al. | |
| 5,835,663 A | * | 11/1998 | Momochi | 386/70 |
| 5,982,979 A | * | 11/1999 | Omata et al. | 386/69 |
| 6,009,232 A | * | 12/1999 | Sakaegi et al. | 386/70 |
| 6,118,923 A | * | 9/2000 | Rodriguez | 386/69 |
| 6,167,188 A | * | 12/2000 | Young et al. | 386/83 |
| 6,195,497 B1 | * | 2/2001 | Nagasaka et al. | 386/69 |
| 6,496,228 B1 | * | 12/2002 | McGee et al. | 348/700 |

FOREIGN PATENT DOCUMENTS

| | | |
|---|---|---|
| JP | 3-097053 | 4/1991 |
| JP | 6-131264 | 5/1994 |
| JP | 9-185462 | 7/1997 |
| JP | 10-198604 | 7/1998 |

OTHER PUBLICATIONS

Tatsuo Mori, et al., "Video–On–Demand System Using Optical Mass Storgae System", Jpn. J. Appl. Phys., vol. 32, No. 11B, Nov. 1993, pp. 5433–5438.

* cited by examiner

*Primary Examiner*—Thai Tran
(74) *Attorney, Agent, or Firm*—Oblon, Spivak, McClelland, Maier & Neustadt, P.C.

(57) ABSTRACT

A hierarchical memory scheme capable of improving a hit rate for the segment containing the random access point rather than improving the overall hit rate of the cache, and a data playback scheme capable of automatically detecting positions that are potentially used as playback start indexes by the user and attaching indexes, are disclosed. The hierarchical storage device stores random access point segment information from which a possibility for each segment to contain a point that can potentially be random accessed in future can be estimated, and controls a selection of the selected segments to be stored in the cache storage device according to the random access point segment information. The data playback device records a plurality of playback start indexes, each playback start index being information regarding a playback position that is determined according to the user input which is recorded when the user input is in a prescribed pattern, and presents the plurality of playback start indexes to a user so as to urge the user to select a desired playback position.

7 Claims, 21 Drawing Sheets

| DATA ID | SEGMENT NUMBER |
|---------|----------------|
| 2 | 0 |
| 2 | 3 |
| 2 | 14 |
| 11 | 0 |
| : | : |

DATA ID = 2

DATA ID = 1

DATA ID = 0
REFERENCE COUNTER = 1

| SEGMENT NO. | MEDIA NO. | RECORDING POSITION | KEEP COUNTER | RAP COUNTER |
|-------------|-----------|--------------------|--------------|-------------|
| 0 | 1 | 128 | 1 | 100 |
| 1 | 1 | 256 | 1 | 0 |
| 2 | 1 | 384 | 1 | 0 |
| 3 | 1 | 512 | 0 | 10 |
| : | : | : | : | : |

RAP COUNTER: 40, 0, 0, 0, :

RAP COUNTER: 200, 0, 30, 0, :

FIG. 18

PLAYBACK START INDEX LIST MEMORY REGION

| IID | DID | PTR | DATE | REF | NAME | PR |
|---|---|---|---|---|---|---|
| 7 | 20 | 2:03:00 | 1998/08/12 | 2 | HIGHLIGHT | P |
| 8 | 41 | 1:39:08 | 1998/03/21 | 1 | 1ST GOAL SCENE | P |

PLAYBACK START INDEXES

IID : INDEX ID
DID : DATA ID
PTR : SEEK POINT
DATE : RECORDING DATE
REF : REF. COUNT
NAME : INDEX NAME
PR : PROTECTION FLAG

HIERARCHICAL STORAGE SCHEME AND DATA PLAYBACK SCHEME FOR ENABLING RANDOM ACCESS TO REALTIME STREAM DATA

BACKGROUND OF THE INVENTION

1. Field of the Invention

The present invention relates to a hierarchical storage device (that can be used as a server side device) having a small capacity primary storage device and a large capacity secondary storage device which uses the primary storage device as a cache and its control method, and a data playback device (that can be used as a client side device) for play-backing data of video, audio, etc., stored in a storage device according to a user operation and its control method.

2. Description of the Background Art

Conventionally, as an inexpensive large capacity storage device, a magnetic tape device, an automatic tape changer for magnetic tapes, an automatic disk changer for removable disks, etc., have been used.

Although these storage devices have a large capacity, they are associated with the problem regarding the response time in the case of random access. For example, in the case of tapes, it is necessary to fast forward or rewind a tape up to a position where the necessary data are recorded. Also, in the case of automatic tape or disk changer, it is necessary to exchange media if the necessary data are recorded on a medium that is currently not mounted on a drive.

For these reasons, there has been a proposition of a hierarchical storage device which incorporates the generally known concept of hierarchical memory by using a hard disk or the like with a high transfer performance and a good random access handling as a primary memory while using the above described large capacity storage device as a secondary storage device.

In general, in such a hierarchical storage device, the primary storage device functions as a cache or a prefetch buffer of data stored in the secondary storage device. In the following, the primary storage device will also be referred to as a cache, while the secondary storage device is also referred to as a library.

In the hierarchical storage device, at a time of making an access to the stored data, whether the necessary data are stored in the cache or not is checked first. If the data are stored in the cache, the data on the cache are accessed. If the data are not stored in the cache, the data on the library are accessed while the accessed data are copied into the cache.

At a time of storing data into the cache, if there is no region left on the cache that can be allocated to that data, there is a need to discard some data on the cache and replace it with new data according to some rules. The known examples of this cache replacement algorithm include the following.

(a) LRU (Least Recently Used): Data for which the elapsed time since it is last accessed is longest will be discarded.

(b) FIFO (First In First Out): Data for which the elapsed time since it is stored in the cache is longest will be discarded.

(c) LFU (Least Frequently Used): Data for which the number of accesses is smallest will be discarded.

These schemes are known to operate efficiently with respect to general data accesses empirically and are currently widely used.

Also, as a unit of transfer between the library and the cache, there are a case of managing transfer in units of data and a case of managing transfer in units of segments (or blocks) into which data are subdivide.

There are also some special cache management schemes including a scheme in which all data that have been opened will be stored into the cache, and a scheme in which only top portions of data are always stored in the cache.

Now, realtime stream data such as video data and audio data are sequentially accessed as time elapses. In such a case, once data transfer is started it is possible to guess the order of data that will be accessed until the data transfer is to be stopped next.

In the case of sequentially transferring consecutive segments in this manner, by storing segments to be used subsequently into the cache while transferring some segment from the cache, it is possible to expect either a seeming disappearance or a reduction of a response time at a time of accessing subsequent segments.

On the other hand, at a time of a start of the sequential transfer, if a segment containing a top of the sequential transfer is not stored in the cache, the time required in accessing the segment that is stored in the secondary storage device will directly give the response time.

Consequently, in the case of making an random access with respect to an arbitrary position in a middle of the realtime stream data, for example, the response time will become long if a segment containing this random access point is not stored in the cache. Namely, in this type of use, the cache hit rate for a segment containing the random access point can largely affect the user's convenience in use.

However, when the conventional cache replacement algorithms are employed for this type of use, the segment containing the random access point will be treated as follows.

(a) In LRU, the segment containing the random access point is regarded as being referred to earlier than other segments that are sequentially accessed thereafter, so that the priority level for becoming a target of discarding is higher for the segment containing the random access point.

(b) in FIFO, the segment containing the random access point is regarded as having a region allocated earlier than other segments that are sequentially accessed thereafter, so that the priority level for becoming a target of discarding is higher for the segment containing the random access point.

(c) In LFU, the priority level for becoming a target of discarding is higher for a segment for which the utilization frequency is lower, regardless of whether it is the segment containing the random access point or not. Consequently, the priority level for becoming a target of discarding is higher for the segment containing the random access and having a lower utilization frequency than a segment not containing any random access point and having a higher utilization frequency.

In other words, in conventional cache replacement algorithm that are originally designed to improve the overall hit rate of the cache, it is impossible to improve the cache hit rate for the segment containing the random access point in the type of use described above, so that it is impossible to reduce the response time at a time of the random access.

Moreover, in order to improve the user's convenience in use at a time of the random access in the type of use that deals with video data or audio data as described above, in addition to a provision to reduce the response time at the data storage device side, it is important to enable a user to easily specify the desired random access point at a data playback operation mechanism.

For example, as an instrument for enabling user operations, recording/playback devices such as those for video and compact disks are now widely spread to most homes. Also, a playback device for reading out audio information or video information from a network and playbacking such information is also becoming widespread.

In these playback devices, a user is required to carry out tedious operations to search out a desired program or scene by using technique such as the fast forward mode, from data stored in the server side or data in a removable storage medium inserted into the playback device.

As a method for resolving the tediousness associated with such operations, the video playback device utilizes a method for recording indexes in the removable storage medium so as to make it easier for a user to search out the desired program or scene, as in VISS (VHS Index Search System) or VASS (VHS Address Search System). Using such a technique, it becomes possible to record a desired playback start position of the user in a removable storage medium, and call up that playback start position later on.

However, in this conventional method, a user is required to add a playback start index by operations according to the user's own discretion, so that there are redundant operational steps in which the user must explicitly add the indexes. Also, it is impossible to enable the user to make a selection from a list of all the recorded playback start indexes.

SUMMARY OF THE INVENTION

It is therefore an object of the present invention to provide a hierarchical memory scheme capable of improving a hit rate for the segment containing the random access point rather than improving the overall hit rate of the cache, such that the user's convenience in use can be improved by reducing the response time at a time of the random access.

It is another object of the present invention to provide a data playback scheme capable of automatically detecting positions that are potentially used as playback start indexes by the user and attaching indexes, and providing a mechanism for enabling the user to handle these indexes easily.

According to one aspect of the present invention there is provided a hierarchical storage device, comprising: a library storage device configured to store realtime stream data in units of segments subdividing each realtime stream data; a cache storage device configured to store selected segments among the segments stored in the library storage device; a memory unit configured to store random access point segment information from which a possibility for each segment to contain a point that can potentially be random accessed in future can be estimated; and a control unit configured to control a selection of the selected segments to be stored in the cache storage device according to the random access point segment information stored in the memory unit.

According to another aspect of the present invention there is provided a method for controlling a hierarchical storage device formed by a library storage device storing realtime stream data in units of segments subdividing each realtime stream data and a cache storage device storing selected segments among the segments stored in the library storage device, the method comprising the steps of: storing random access point segment information from which a possibility for each segment to contain a point that can potentially be random accessed in future can be estimated; and controlling a selection of the selected segments to be stored in the cache storage device according to the random access point segment information stored by the storing step.

According to another aspect of the present invention there is provided a data playback device, comprising: an output unit configured to playback and output either one or both of input audio data and input video data; a command unit configured to command playback, stop, or shifting of a playback position forward/backwards, to the output unit according to a user input; a memory unit configured to store a plurality of playback start indexes; and a control unit configured to record information regarding a playback position that is determined according to the user input as a playback start index in the memory unit when the user input received by the command unit is in a prescribed pattern, and to present the plurality of playback start indexes recorded in the memory unit to a user so as to urge the user to select a desired playback position.

According to another aspect of the present invention there is provided a method for controlling playback and output of either one or both of input audio data and input video data according to a user input indicating playback, stop, or shifting of al playback position forwards/backwards, the method comprising the steps of: recording a plurality of playback start indexes, each playback start index being information regarding a playback position that is determined according to the user input which is recorded when the user input is in a prescribed pattern; presenting the plurality of playback start indexes recorded by the recording step to a user so as to urge the user to select a desired playback position; and starting playback from the desired playback start position selected by the user using the plurality of playback start indexes presented by the presenting step.

According to another aspect of the present invention there is provided a server client system, comprising: a hierarchical memory server having a library storage device storing realtime stream data in units of segments subdividing each realtime stream data and a cache storage device storing selected segments among the segments stored in the library storage device; and a data playback client for playbacking and outputting a desired segment of a desired realtime stream data obtained from the hierarchical memory server according to a user input indicating playback, stop, or shifting of a playback position forwards/backwards; wherein the hierarchical memory server includes: a server side memory unit configured to store random access point segment information from which a possibility for each segment to contain a point that can potentially be random accessed in future can be estimated; a control unit configured to control a selection of the selected segments to be stored in the cache storage device according to the random access point segment information stored in the server side memory unit; and a segment transfer management unit configured to read out the desired segment of the desired realtime stream data requested from the data playback client, either from the cache storage device when the desired segment is stored in the cache storage device, or from the library storage device when the desired segment is not stored in the cache storage device, and to transfer the desired segment to the data playback client; and the data playback client includes: a client side memory unit configured to store a plurality of playback start indexes, each playback start index being information regarding a playback position that is determined according to the user input which is recorded when the user input is in a prescribed pattern; and a control unit configured to present the plurality of playback start indexes recorded in the client side memory unit to a user so as to urge the user to select a desired playback position, and to request a segment containing the desired playback position selected by the user as the desired segment to the hierarchical memory server.

Other features and advantages of the present invention will become apparent from the following description taken in conjunction with the accompanying drawings.

BRIEF DESCRIPTION OF THE DRAWINGS

FIG. 4 is a diagram showing an exemplary data structure for managing information necessary at a discarding segment selection unit in the hierarchical storage device of FIG. 1.

FIG. 18 is a diagram showing an exemplary configuration of a playback start index list used in the data playback device of FIG. 17.

DETAILED DESCRIPTION OF THE PREFERRED EMBODIMENTS

Referring now to FIG. 1 to FIG. 16, the first embodiment of the present invention which is directed to the hierarchical memory scheme will be described in detail.

When it is possible to guess in advance that there is some tendency in the data access pattern, it is preferable to adopt a cache management scheme which can operate efficiently for that pattern, and it is also preferable to determine which cache management scheme is to be adopted according to what kinds of performance are regarded important in the type of use of the device.

For this reason, in the hierarchical memory scheme of the present invention, an information as to whether each segment contains a random access point or not is included in the judgement criteria for the purpose of determining the discarding priority order at a time of the cache replacement or the storing priority order at a time of the data prefetching, assuming the specific type of use in which the response time at a time of the random access is to be shortened.

Figure 1:
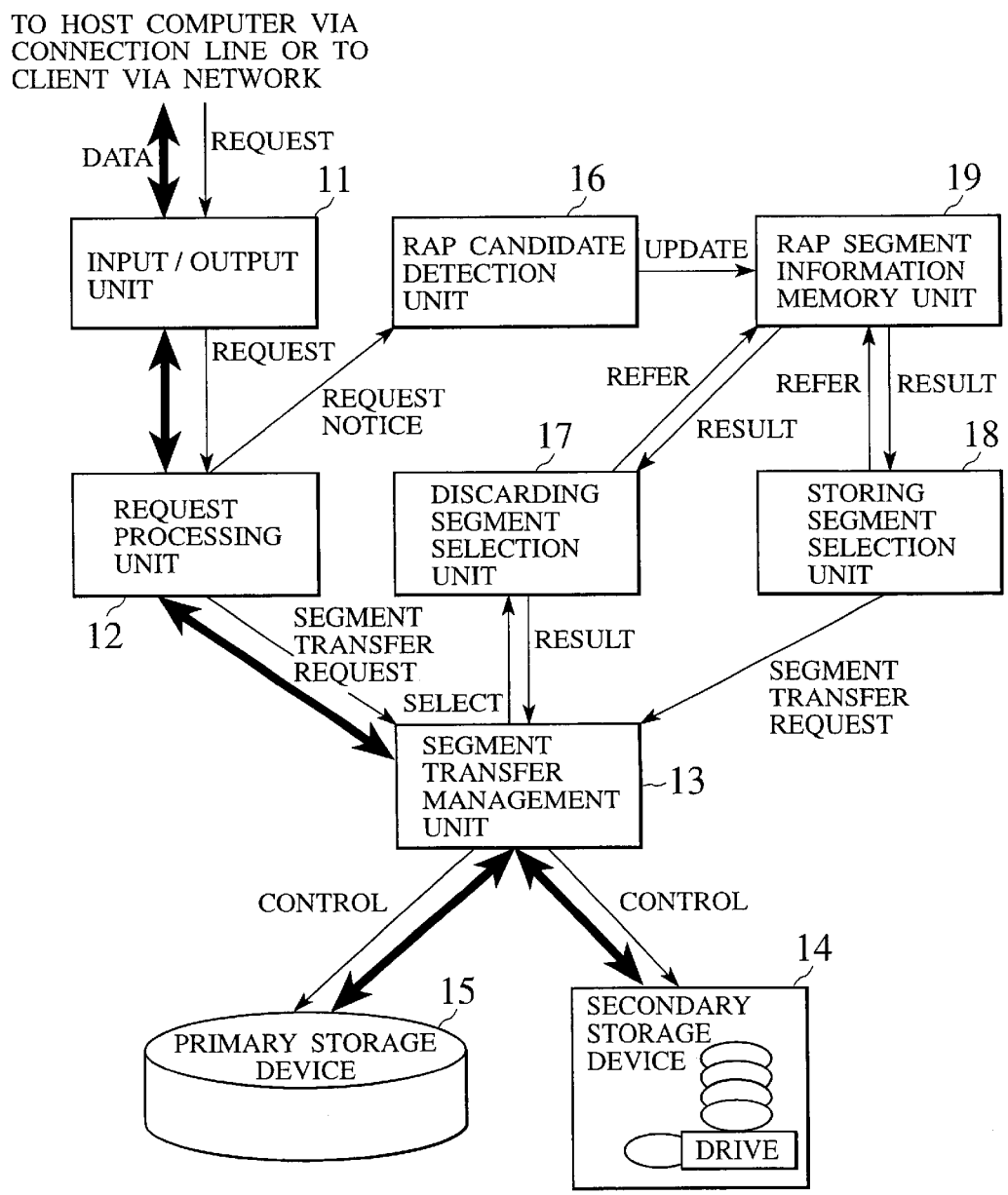
FIG. 1 is a block diagram showing an exemplary configuration of a hierarchical storage device according to the first embodiment of the present invention.

FIG. 1 shows an overall configuration of a hierarchical storage device according to the first embodiment. In FIG. 1 an input/output unit 11 is a unit that functions as an interface with respect to the external of this hierarchical storage device. In the case where this hierarchical storage device is configured as an instrument that operates by being connected to a host computer, the input/output unit 11 contains a connection interface with respect to the host computer and its control software, and carries out transmission and reception of requests and data with respect to the host computer. In the case where this hierarchical storage device is configured as a computer that operates as a file server, the input/output unit 11 contains a network interface and its control software, and carries out transmission and reception of requests and data with respect to a client.

A secondary storage device 14 (which will also be referred to as a library hereafter) is formed by a magnetic tape device, an automatic tape changer for magnetic tapes, or an automatic disk changer for removable disks, so as to realize a large capacity inexpensively. The library stores all data to be stored in the hierarchical storage device of the first embodiment by dividing them into segments. Here, a segment is a unit of management which subdivides data into a size specific to the system. The size of a segment is determined in view of a total capacity and transfer rates of the library and a cache storage device, a transfer rate at a time of utilizing data, etc.

A primary storage device 15 (which will also be referred to as a cache hereafter) is formed by a hard disk device which is more expensive and has a smaller capacity than the library but which has a good random access handling and a shorter response time at a time of access. The cache temporarily stores selected segments among the segments stored in the library. The segments on the cache are copied from the segments stored in the library. However, in the case where a segment writing is carried out, a segment on the cache can temporarily have a newer content which is different from a corresponding segment on the library.

The hierarchical storage device of FIG. 1 also include a request processing unit 12, a segment transfer management unit 13, a RAP (Random Access Point) candidate detection unit 16, a discarding segment selection unit 17 and a storing segment selection unit 18, which can be collectively provided as a control unit. The control unit controls segment transfer between the library and the cache, so as to realize improvement of the performance that is regarded important for the hierarchical storage device such as shortening of an average response time and improvement of a total transfer performance. In the first embodiment, a RAP segment information stored in a RAP segment information memory unit 19 is used as one of the criteria for judgement at a time of selecting a segment to be stored into the cache or a segment to be discarded from the cache.

Note that each element constituting this control unit can be realized either in a form of software, hardware, or a combination of software and hardware. In the case of realizing it by software it can be realized by installing a program for causing a computer to function as each element into a general-purpose computer from a medium storing that program.

The RAP segment information is obtained by accumulating information regarding random accesses from the past requests, in order to estimate a possibility of being random accessed in future for each segment.

Also, a RAP segment is a segment which is judged as having a high possibility of containing a point to be random accessed in future according to the RAP segment information.

The control unit judges whether each segment is a RAP segment or not by referring to the stored RAP segment information, or obtains a possibility of being random accessed in future for each segment as a numerical value.

Next, the method for replacing segments on the cache according to the first embodiment will be described. Upon receiving an access request from the external through the input/output unit 11, the control unit analyzes that request at the request processing unit 12, and if a segment containing a specified point is stored in the cache 15, an access to that segment is made. If that segment is not stored in the cache 15, a segment transfer request for copying that segment from the library 14 to the cache 15 is issued to the segment transfer management unit 13. The segment transfer management unit 13 carries out the scheduling of a plurality of segment transfer requests, and copies segments stored in the library into the cache. Here, the segment access by the request processing unit 12 may be carried out after the segment copying is finished or the segment copying and the segment access may be processed in parallel in a form of pipeline processing.

When a need to newly store a segment into the cache arises, the control unit allocates a region of a necessary size on the cache. If a region of a necessary size is not available, the other segment stored in the cache is discarded to secure a region of a necessary size. At this point, the segment transfer management unit 13 requests a selection of a candidate for discarding to the discarding segment selection unit 17. The discarding segment selection unit 17 refers to the RAP segment information in the RAP segment information memory unit 19 and determines the discarding priority order according to the result of referring. Then, a segment having the highest discarding priority order is selected as the candidate for discarding and notifies the result to the segment transfer management unit 13.

Note that there are cases where information other than the RAP segment information is also to be used as a key for determining the discarding priority order, as will be described in detail below.

Note also that there is no need to determine the discarding priority orders for all the segments, and the discarding priority orders can be calculated for only selected segments such that a segment with the highest discarding priority order can be determined.

Also, the calculations necessary in determining the discarding priority order may not have to be all carried out at a timing where the discarding segment selection unit 17 is called up (the selection of the candidate for discarding is requested), and may be carried out at a timing where there is a change in the key for determining the discarding priority order.

In this way, it is possible to increase a probability for having a segment containing a random access point remaining on the cache at a subsequent timing where the random access is made.

A timing for accessing data contained in a segment is not the only timing for storing a segment into the cache. For example, it is also useful to prefetch a segment with a high possibility of being accessed thereafter into the cache in advance. To this end, the control unit is also provided with the storing segment selection unit 18.

The storing segment selection unit 18 selects a candidate for a segment to be prefetched among those segments which are not existing on the cache, regardless of whether that segment contains a point specified by an access request or not. Then the storing segment selection unit 18 judges whether this candidate for prefetching is to be stored into the cache or not, and issues the segment transfer request to the segment transfer management unit 13.

For example, among data that have been opened and data that have not been opened, it is possible to estimate that data that had been opened have a higher possibility of being accessed in near future. For this reason, the storing segment selection unit 18 can be made to select a segment that belongs to data that had been opened and that has a high possibility of becoming a random access point as the candidate for prefetching. At this point, the storing segment selection unit 18 refers to the RAP segment information in the RAP segment information memory unit 19, and selects the candidate for prefetching and judges whether it should be pre fetched or not according to the result of referring.

Note that there may be a plurality of keys for selection of the candidate for prefetching and judgement as to whether or not to prefetch including not just the RAP segment information but also an open/close state of each data, etc. The selection of the candidate for prefetching and the judgement as to whether or not to prefetch are carried out at a timing where there is a change in these keys.

In this way, a segment containing a point which has a high possibility of being random accessed among the segments belonging to opened data will have a possibility of being prefetched into the cache before it is actually accessed. Consequently, a probability for having a segment containing that point already stored in the cache at a subsequent timing where the random access is made can be increased.

Next, a method for obtaining an information regarding the random access which is to be stored as the RAP segment information will be described. In this hierarhical storage device, the information regarding the random access is obtained from a request of a client or a host computer. Upon receiving a request of any type through the input/output unit 11, this request is notified to the RAP candidate detection unit 16. At the RAP candidate detection unit 16, this request and records of past requests are referred, and whether there exists any RAP candidate or not is checked. When the RAP candidate is detected, the RAP segment information for a segment containing that point is updated.

The RAP candidate may be given simply by a point specified by a seek request, but in order to obtain the information regarding the random access that is necessary for the RAP segment information, the RAP candidate should preferably be given by a point that satisfies conditions determined in view of a type of use of the entire system in which the present invention is to be applied and the tendency of user operations.

In the following, several heuristic methods for detecting the RAP candidate will be described. In the case of making a random access, a seek request for that point is always issued from a client or a host computer.

Figure 2A:
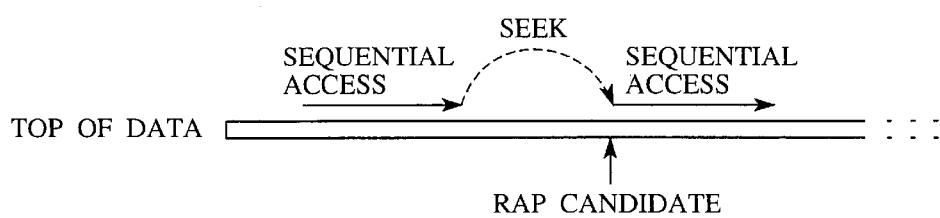
FIGS. 2A, 2B and 2C are diagrams for explaining exemplary conditions for RAP candidate detection that can be used in the hierarchical storage device of FIG. 1.

The first method updates the RAP segment information for a segment containing a point specified by this seek request. FIG. 2A shows an example of a point that satisfies this condition.

Note that, in the type of use that deals with a large capacity stream data, a point specified by the seek request is not necessarily a point to which the random access is intended by the user on the client side. For example, in order to realize playback of data in the fast forward mode, there are cases which adopt a skip scheme in which a seek with a small step width and a small amount data access are to be repeated. In such cases, if every seek target point is judged as the random access point, all the segments that are playbacked in the fast forward mode by the skip scheme will be regarded as random access segments.

Figure 2B:
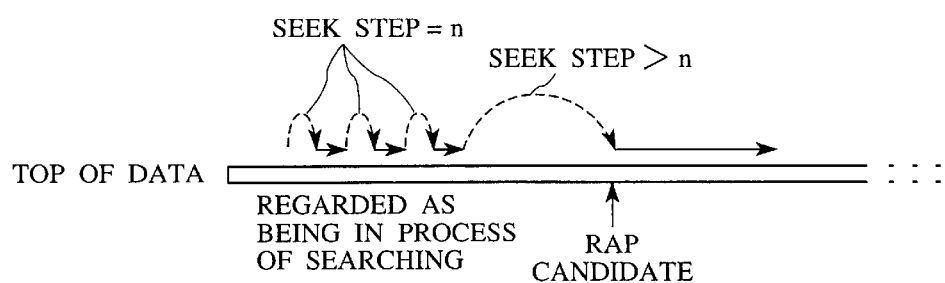

For this reason, the second method judges that a seek target point during such accesses are not random access points, and detects a seek target point as the RAP candidate only when the seek step is larger than a prescribed threshold. Namely, the RAP segment information of a segment containing a seek target point for which the seek step is large is updated, while the RAP segment information of a segment containing a seek target point for which the seek step is small is not updated. Else, the RAP segment information of a segment containing each seek target point is updated to indicate a lower possibility of being random accessed for a smaller step width of each repeated seek. FIG. 2B shows an example of a point that satisfies this condition.

Also, in general, playback of data in the fast forward mode is carried out for the purpose of searching a desired point of the user. Consequently, the normal playback start point after the playback in the fast forward mode is often a random access point intended by the user. However, such a point cannot be estimated from the seek request or the seek step alone.

Figure 2C:
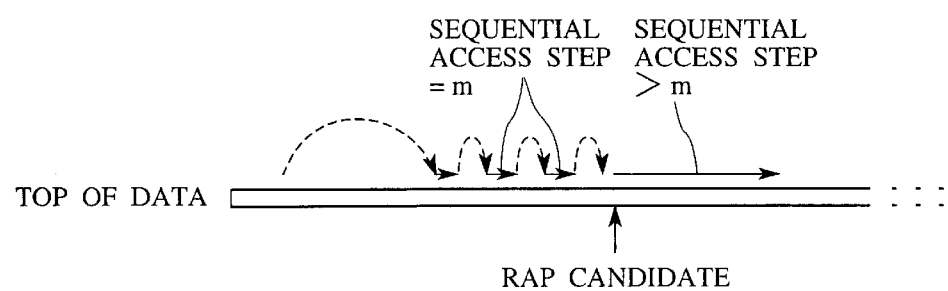

For this reason, the third method pays attention to an amount of data that are sequentially accessed after seek. Namely, an amount of data that are sequentially accessed after seek is counted, and when the counted data mount exceeds the data mount to be sequentially accessed by the skip scheme, for example, it can be estimated that the normal playback after the fast forward playback has started. Consequently, in such a case, a point where the sequential access in the data mount over a prescribed value has started after seek is detected as the RAP candidate. Namely, the RAP segment information of a segment containing a point at which the sequential access over a prescribed value has started after seek is updated, while the RAP segment information for any other seek target point is not updated. Else, the RAP segment information of a segment containing each seek target point is updated to indicate a lower possibility of being random accessed for a smaller amount of sequentially accessed data after each repeated seek. FIG. 2C shows an example of a point that satisfies this condition.

There are also cases in which, even when the normal playback is started after the fast forward playback, that point is not an intended random access point of the user. In such a case, it is expected that the user recognizes this fact after playbacking for a short period of time and resumes the search using the fast forward playback again. For this reason, it can be estimated that a possibility of being an intended random access point of the user is higher for a larger amount of data that are sequentially accessed after seek. Consequently, at a time of updating the RAP segment information of a segment containing a point at which the sequential access over a prescribed value has started after seek (and not updating the RAP segment information for any other seek target point), the RAP segment information may be updated to indicate a higher possibility for being random accessed for a larger amount of sequentially accessed data after seek.

The methods described above estimate the tendency of the subsequent random access from the past seek requests or read requests.

Here, if it is possible to register the intended random access point of the user in advance, the random access point can be estimated most accurately according to this registered information. For this reason, the user may directly specify and register the random access point, but it is also possible to store information on preferences of the user regarding the random access in advance, analyze data and estimate the random access point by matching the data properties with the stored user preferences, and register the random access point so estimated, such that it is also possible to update the RAP segment information before the user uses it. In any case, at a timing where a request for registering some point on data as the random access point is received, the RAP candidate detection unit 16 updates the RAP segment information of a segment containing that point.

In this hierarchical storage device, it suffices to have selected ones of mechanisms that can estimate the random access point more efficiently according to the types of requests that can be used or the type of use of the entire system including the client and the host computer, among the various mechanisms described above.

The RAP segment information to be used in this hierarchical storage device can be given in any of several forms described below, land storing in the RAP segment information memory unit 19, updating from the RAP candidate detection unit 16, and referring from the discarding/storing segment selection unit 17/18 will take forms suitable for the form of the RAP segment information used.

Figures 3A, 3B, 3C:
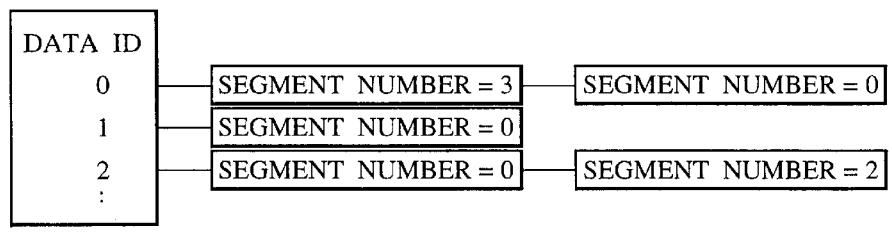
FIGS. 3A, 3B and 3C are diagrams showing exemplary configurations of a RAP segment information memory unit in the hierarchical storage device of FIG. 1.

A first exemplary RAP segment information storing form is that in which a table containing only entries of the RAP segments is formed as shown in FIG. 3A, or a list concatenating entries of the RAP segments is formed as shown in FIG. 3B.

In order to update the RAP segment information so formed, a mechanism for adding or deleting an entry with respect to the above described table or list is provided. In the case of detecting the RAP candidate at the RAP candidate detection unit 16 and updating the RAP segment information of a segment containing that point, an entry of that segment is added to the above described table or list. On the contrary, when the segment corresponding to the entry contained in the above described table or list is no longer judged as the RAP segment, that entry is deleted from the above described table or list.

A second exemplary RAP segment information storing form is that in which the tendency of past operations regarding the random access that were made with respect to each segment is indicated by numerical values, as shown in FIG. 3C. In this form, a RAP counter for indicating the tendency for containing the RAP candidate is provided for each segment. Note that the reference counter and the keep counter shown in FIG. 3C will be described below.

In order to update the RAP segment information so formed, a mechanism for incrementing or decrementing the RAP counter of the specified segment is provided. As described above, an increment of the RAP counter to be used here may be changed according to the seek step or the amount of sequentially accessed data at a time of detecting the RAP candidate at the RAP candidate detection unit 16. Also, an increment of the RAP counter to be used here may be changed according to the condition used in detecting the RAP candidate among the RAP candidate detection conditions shown in FIGS. 2A, 2B and 2C.

A first exemplary RAP segment information referring form is that which judges whether the specified segment is the RAP segment or not. This is suitable for the case where it suffices to apply the identical judgement criteria to all scenes for which the RAP segment information is necessary.

In the form of storing the RAP segment entry in the RAP segment information memory unit 19 (and not storing an entry for a segment that is not the RAP segment), the specified segment can be judged as the RAP segment when an entry for that segment is contained in the table or list of the RAP segment information memory unit 19.

In the form that has a RAP counter in the RAP segment information memory unit 19, the specified segment can be judged as the RAP segment when the RAP counter of that segment is above a prescribed threshold.

A second exemplary RAP segment information referring form is that which refers to the information stored in the RAP segment information memory unit 19 itself (simply reads out the stored information). This is suitable for the case where there is a possibility of having different interpretations applied depending on a referred portion for which the RAP segment information is necessary. Such cases include, for example, a case where the judgement criteria used in judging whether the specified segment is the RAP segment or not is different at different referred portions, a case where there is a referred portion at which the processing to sort segments according to the RAP counter values is required, and a case where there is a referred portion at which the processing to sequentially search through the list in the RAP segment information memory unit 19 is required.

Note that the RAP segment information is referred by the discarding segment selection unit 17 and the storing segment selection unit 18, and the referring method or the utilization method of the referred result may be different at different referred portions. For example, it is possible to adopt such a utilization method that segments are classified according to the judgement result as to whether it is the RAP segment or not at a time of the discarding segment selection while the segments are sorted by referring to the values of the RAP counters at a time of the storing segment selection.

Next, the concrete example of the hierarchical storage device of the first embodiment realized as a server for handling a large capacity realtime stream such as video and audio will be described.

First, the system configuration in this concrete example will be described. The hierarchical storage device is connected with a client device through a network. The client device reads out the realtime stream from the hierarchical storage device through the network and playback them, or record the realtime stream into the hierarchical storage device through the network, according to operations of the user.

The client device,has an operation unit for enabling the user to handle the realtime stream. For example, the client device capable of carrying out operations such as playback, recording, fast playback (fast forward), fast reverse (rewind), pause, index attaching, index based playback, etc., and a remote control device equipped with operation buttons for these operations are provided. Else, these operation buttons may be displayed on a screen of the client device such that each of them can be selected using a pointing device such as mouse.

The client device issues a various types of requests to the hierarchical storage device according to the user operations. In the case of handling data as general files, general file operation requests such as "open", "seek", "read", "write", "close", etc., are provided. In the case of handling data as the realtime stream, when the user makes an operation such as playback or fast forward, the above described general file operation requests are appropriately combined according to that operation at the client device side and issued to the hierarchical storage device side. Else, a request corresponding to each user operation may be provided separately, and issued to the hierarchical storage device side according to the user operation.

Next, the configuration and the operation of the hierarchical storage device in this concrete example will be described. An automatic disk changer capable of storing a plurality of optical disks is used as the library storage device 14, while a hard disk device is used as the cache storage device 15. A network interface and its control software are provided at the input/output unit 11.

The realtime stream data (contents) are recorded in the library 14 by being subdivided into segments of a size specific to the system. In order to manage the data storing state on the library, an index table storing a medium number of medium on which each segment is stored and a recording position on that medium is maintained in the control unit (in a form shown in FIG. 3C, for example). In addition, a currently used capacity and a remaining available capacity of each medium are also maintained in the control unit.

Similarly, various information for the purpose of managing the cache 15 is also maintained in the control unit. More specifically, a currently used capacity and a remaining available capacity of the cache, and a table for managing segments stored in the cache are maintained in the control unit. Also, a list for temporarily holding segment transfer requests is provided in preparation to the case where a plurality of segment transfer requests occur simultaneously between the library and the cache. The segment transfer management unit 13 schedules the processing order whenever the segment transfer becomes possible, and carries out the segment transfer. The segment replacement scheme at a time of the segment transfer will be described later on.

Next, the basic operation at a time of transmitting data from the hierarchical storage device to the client device as the realtime stream in response to a request from the client will be briefly described.

Upon receiving an open request from the client through the input/output unit 11, the request processing unit 12 produces a stream management information corresponding to a new realtime stream. The stream management information contains an information regarding opened data (identifier, access right, etc.), various resources allocated (buffer to be used, etc.), and a seek pointer indicating the number of bytes from the top of data to a point currently accessed.

At a time of accessing data upon receiving a read request from the client, the request processing unit accesses a segment on the cache 15. In the case where a segment containing a point pointed by the seek pointer is not stored in the cache, a segment transfer request is issued first, and a segment on the cache is accessed after that transfer request is executed.

Also, in the case of playbacking a large capacity realtime stream such as video or audio, it can be guessed that data will be sequentially accessed, so that the request processing unit 12 issues a segment transfer request for prefetching a plurality of consecutive segments subsequent to a segment containing a point to be accessed into the cache.

Note that, in order to guarantee the continuity of the realtime stream, there is a need to guarantee that it is always possible to allocate a region for storing an accessed segment and segments to be prefetched. For this reason, a size secured by all the realtime streams at each moment within a total capacity of the cache is managed. When the open request is received, if a size necessary for the new realtime stream cannot be secured on the cache, the open request will be refused.

In this concrete example, a segment to be stored into the cache or a segment to be discarded from the cache is selected according to the RAP segment information as described above. In the following, the configuration of the RAP segment information and its utilization method in the scheme using the above described RAP counter will be described, but it is possible to modify this case to use the above described scheme for storing RAP segment entries in a table or a list as should be apparent to those skilled in the art, and the present invention can be realized by using any of these schemes.

For the RAP segment information memory unit 19, a dedicated table having a RAP counter of each segment as an entry may be provided, but in the case of having the index table for the sake of managing the library as described above, it is possible to utilize this index table by adding a field for the RAP counter in the index table (see FIG. 3C). In this way, there is no need to newly provide a procedure for adding or deleting entries on the dedicated table for the RAP counters.

When a segment is newly generated as data are added to the library, an entry of that segment is added to the index table, and the value of the RAP counter of that entry is initialized to 0. The updating of the RAP counter is carried out at a timing where the RAP candidate is detected by the RAP candidate detection unit 16. The RAP candidate detection conditions to be used here are as follows.

Condition 1: At a timing where a seek request is received by the control unit, a point specified by that seek request is detected as the RAP candidate (see FIG. 2A).

Condition 2: Denoting a seek step to be skipped in the case of realizing the fast forward or the fast reverse by the skip scheme at the client as n, at a timing where a seek request is received by the control unit, if a width from a point currently pointed by the seek pointer to a point specified by that seek request is larger than n, a point specified that seek request is detected as the RAP candidate (see FIG. 2B).

Condition 3: A pointer P for recording a point at which the sequential access is started and a counter C for recording an amount of sequentially accessed data starting from that point are provided, and upon receiving the open request, the point P is initialized to the top of data while the counter C is initialized to 0. Then, upon receiving a seek request, the seek target point is substituted into the pointer P while 0 is substituted into the counter C. Then, upon receiving a read request, its access size is added to the counter C. Denoting an amount of sequentially accessed data in the case of realizing the fast forward or the fast reverse in the skip scheme at the client device as m, a point pointed by the pointer P at a timing where the counter C exceeds m is detected as the RAP candidate (see FIG. 2C).

Condition 4: In the case where a random access point registration request is provided as a request from the client device to the hierarchical storage device, at a timing where this registration request is received, the specified point is detected as the RAP candidate Note that there is no need for the RAP candidate detection unit 16 to have a unit for checking all of the above four conditions. In view of the requests provided at the client and their access patterns, it suffices to select in advance those conditions among the above described four conditions that can be expected to be able to detect the RAP candidate appropriately, and to provide a unit for storing those conditions and updating the RAP segment information by detecting a point that satisfies any of the stored conditions.

For example, in the case where it is known in advance that the fast forward/fast reverse is to be carried out by the skip scheme, the condition 1 can be ignored and a combination of only conditions 2, 3 and 4 can be used.

The simplest possible scheme for the RAP counter updating is a scheme which increments the RAP counter by one for a segment containing the RAP candidate whenever the RAP candidate is detected. However, it is also possible to change an increment of the RAP counter in the case where the possibility of becoming the random access point subsequently is different depending on the type of RAP candidate detection condition or a state (the seek step or the sequentially accessed amount) at a time of the RAP candidate detection.

For example, in the case where a random access point registration request from the client is provided, the registration requested point can be considered as having a higher possibility of becoming the random access point subsequently than points obtained by other conditions for estimating the RAP candidate at the hierarchical storage device side from the tendency of the seek request, so that the increment of the RAP counter in the case of updating the RAP counter according to the condition 4 can be made larger than the other conditions.

In the conditions 1 and 2, the RAP counter is updated according to the seek request, but the increment of the RAP counter may be changed according to its seek step width. For example, if the seek step is small, the seek target point has a possibility of being prefetched in the cache, so that the increment of the RAP counter can be made larger for the larger seek step.

In the condition 3, the RAP counter is updated according to the amount of sequentially accessed data, but the increment of the RAP counter may be changed according to that data amount. For example, in the case where the normal playback is started after the search using the fast forward but the fast forward is started again in short time as it was not a desired point of the user, it can be considered as having a low possibility of becoming the random access point subsequently, so that the RAP counter can be incremented again at a timing where the amount of sequentially accessed data exceeds some threshold (such as an amount of data required for playbacking 10 seconds, for example).

Also, in the case where points set up in data in advance can be random accessed but points found by the user using the fast forward or the like cannot be specified as the random access points later on at the client, the condition 3 is rather meaningless. In such a case, the increment of the RAP counter in the case of detecting the RAP candidate by the other conditions can be made larger than the condition 3.

As a mechanism for referring to the RAP segment information, it suffices to provide at least one of a mechanism for referring to the RAP counter value of the specified segment and a mechanism for judging whether the specified segment is a RAP segment or not according to the RAP counter value.

A mechanism for referring to the RAP counter value can be configured such that the corresponding entry is determined in the index table from the data identifier of the specified segment and the segment number in the data, and a value of the RAP counter field of that entry is returned.

A mechanism for judging whether it is a RAP segment or not can be configured to refer to the RAP counter value of the specified segment and return the judgement result that it is a RAP segment if the RAP counter value is greater than or equal to some threshold T or the judgement result that it is a normal segment otherwise.

Note that a value of the threshold T may be changed according to the situation. Also, the threshold T may be changed for each data to which the specified segment belongs. For example, for data to which the specified segment belongs, a value expressed by a linear function of an average value of all the segments belonging to that data can be set as the threshold T.

In the above, how the RAP segment information is stored and referred has been described. In the following, how the segment transfer between the library and the cache is controlled using the RAP segment information will be described.

At a time of newly storing a segment into the cache, the control unit allocates a region of a necessary size on the cache. At this point, if a sufficient region is not available, an empty region is created by discarding other segments on the cache. In this example, the following information is taken into account as keys for determining the discarding priority order among the segments.

(1) RAP segment information:
(2) Whether data to which this segment belongs is in the open state or the close state: and
(3) Whether this segment is in keep state or not.

The discarding segment selection unit 17 determines the discarding priority order among the segments on the cache by combining these information by including at least the RAP segment information, and sets a segment with the highest discarding priority order as the candidate for discarding.

Here, a certain data is in the open state implies that it is in a state of being opened from at least one stream. On the contrary, a certain data is in a close state implies that it is in a state where there is no stream that is opening that data. In order to refer to whether each data is in the open state or the close state, it suffices to provide a reference count for each data. When the data is opened from a stream the corresponding reference counter is incremented by one, and when the data is closed the corresponding reference counter is decremented by one. By referring to the reference counter corresponding to a certain data, it can be judged that this data is in the open state if that value is greater than 0.

Also, setting a segment in the keep state implies that declaring to access that segment in near future subsequently. A segment in the keep state is guaranteed to be stored in the cache until the keep state is released after it is stored in the cache once.

In this concrete example, at a time of transmitting the realtime stream, a segment containing a point to be accessed is set in the keep state. Also, segments subsequent to that segment that are to be prefetched (a prescribed number of segments that are consecutive to that segment where the prescribed number is appropriately determined in advance by the system specification) are also set in the keep state. If these segments are not on the cache, the segment transfer request is issued. When these segments are sequentially accessed and the seek pointer is shifted from an accessed segment to a next prefetched segment, the keep state of the previously accessed segment is released.

Whether or not to set each segment in the keep state is managed for each stream. When there is at least one stream that is setting a certain segment in the keep state, that segment is kept in the keep state. In order to refer to whether each segment is in the keep state or not, the keep counter field is added to the index table similarly as the RAP counter. This keep counter is initialized to 0. When the segment is set in the keep state by a stream the corresponding keep counter is incremented by one, and when the keep state is released the corresponding keep counter is decremented by one. By referring to the keep counter corresponding to a certain segment, it can be judged that this segment is in the keep state if that value is greater than 0.

Next, a policy for determining the discarding priority order by combining the above described information will be described. Segments stored in the cache are classified into four categories depending on whether it is opened or not and whether it is a RAP segment or not as follows.

(a) A normal segment belonging to data in the close state:
(b) A normal segment belonging to data in the open state:
(c) A RAP segment belonging to data in the close state: and
(d) A RAP segment belonging to data in the open state.

In this example, the discarding priority order is regarded higher in an order of (a), (b), (c) and (d), and segments contained in the category for which the discarding priority order is higher is sequentially set as the candidate for discarding. Here, however, the segment in the keep state is not selected as the candidate for discarding. The segment in the keep state may be removed from the candidate for discarding after the classification into the above described categories is made, or the segment in the keep state may be removed first before the classification into the above described categories (the determination of the discarding priority order) is made.

An implementation scheme for realizing the above described policy can be either a scheme for classifying all the segments on the cache when the segment replacement becomes necessary, or a scheme for providing a segment list corresponding to each category and updating that list whenever the segment state changes. Note however that the processing is concentrated at a time of the segment replacement in the former so that the former scheme may be inconvenient for a system that carries out the real time processing. For this reason, the latter implementation scheme will be described in detail now.

FIG. 4 shows an exemplary data structure to be stored for the purpose of managing information necessary at the discarding segment selection unit 17, where four segment lists corresponding to the above four categories are provided. In each segment list, segments nodes representing segments contained in the corresponding category which are stored on the cache are inserted. The segment node of each segment records a data identifier of the data to which that segment belongs and a segment number of that segment.

Figure 5:
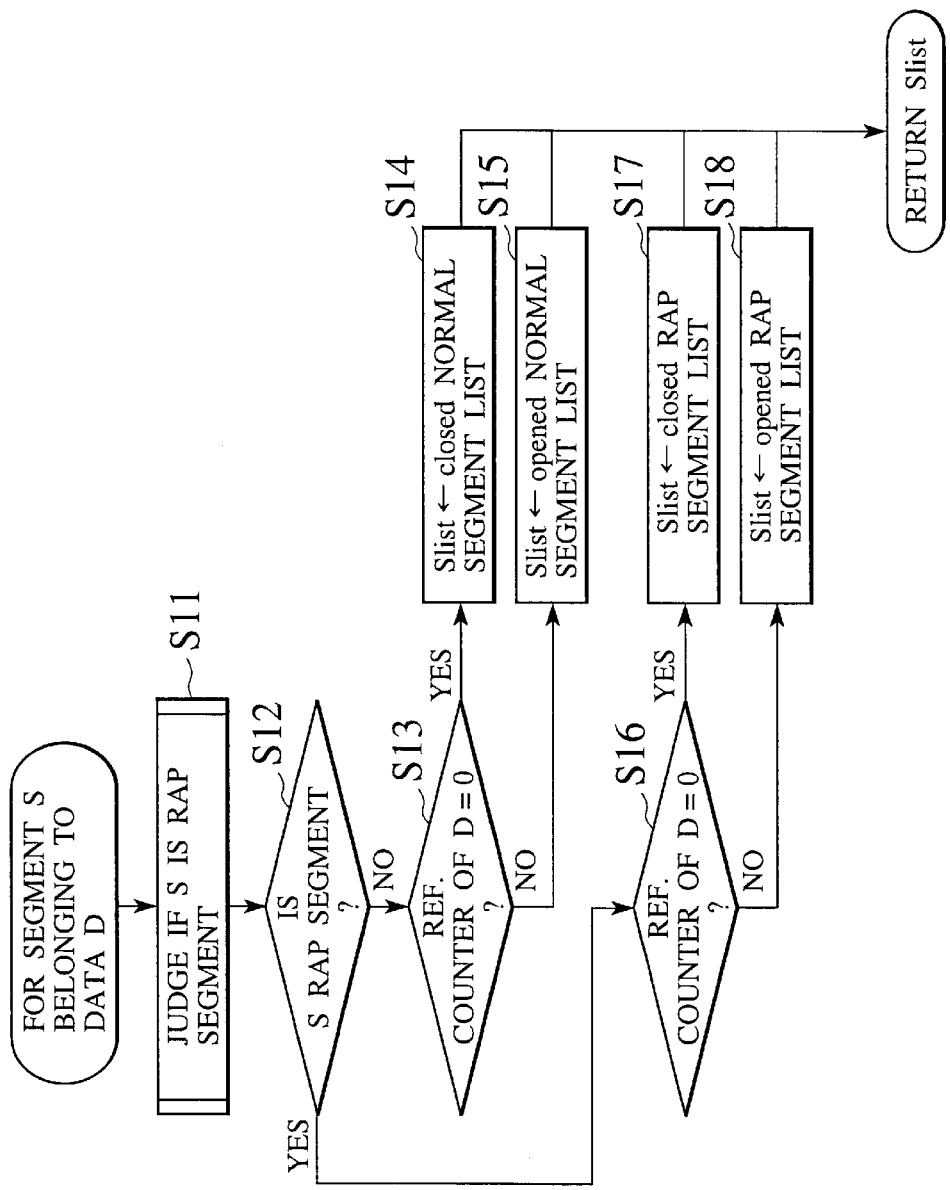
FIG. 5 is a flow chart showing an exemplary operation for selecting a segment list corresponding to a category in which a segment is to be contained in the hierarchical storage device of FIG. 1.

FIG. 5 shows the operation at a time of storing a segment into the cachet, for selecting a segment list into which a segment node for that segment is to be inserted.

First, whether that segment is a RAP segment or not is judged by referring to the RAP segment information (S11, S12). In addition, the reference counter of the data to which that segment belongs is checked (S13, S16) and whether that data is in the open state or in the close state is judged. Depending on the combination of these two judgement results, one of the four segment lists described above is selected (S14, S15, S17, S18).

The discarding segment selection unit 17 carries out the node re-insertion/addition/deletion with respect to these segment lists such that each of the above described lists indicates a correct state, when the data is opened/closed, when a segment is stored/discarded on the cache, or when the RAP segment information is updated.

Figure 6:
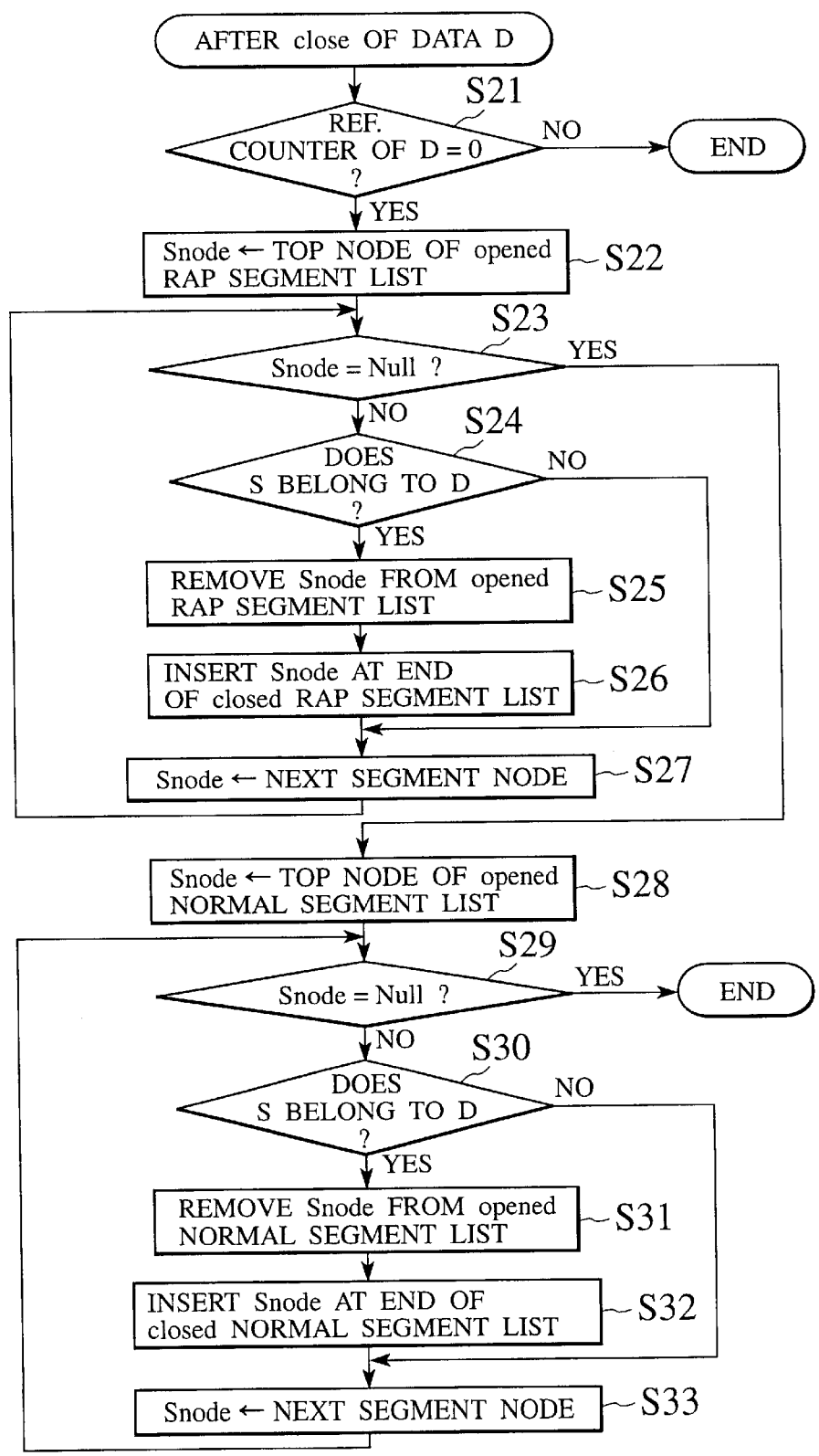
FIG. 6 is a flow chart showing an exemplary operation for updating a data structure at a discarding segment selection unit in the hierarchical storage device of FIG. 1 in the case where data is closed.

In the case where the data is closed, as shown in FIG. 6, when the state of that data is changed from the open state to the close state (S21 YES), an opened RAP segment list is searched through (S22, S23 to S27), and the segment node belonging to that data (S24 YES) is removed from the opened RAP segment list (S25) and inserted at the end of a closed RAP segment list (S26). In addition, an opened normal segment list is searched through (S28, S29 to S33), and the segment node belonging to that data (S30 YES) is removed from the opened normal segment list (S31) and inserted at the end of a closed normal segment list (S32).

Figure 7:
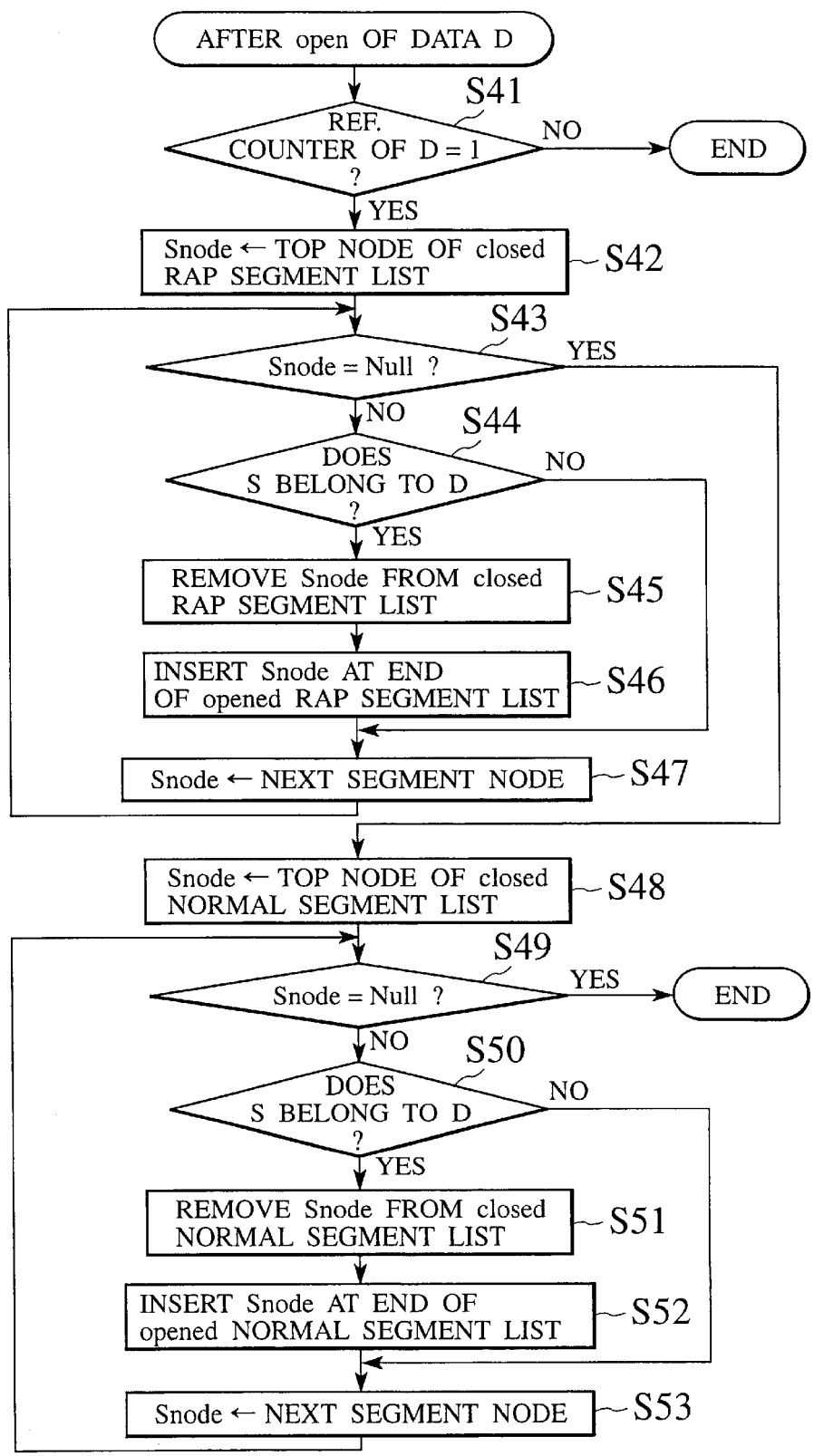
FIG. 7 is a flow chart showing an exemplary operation for updating a data structure at a discarding segment selection unit in the hierarchical storage device of FIG. 1 in the case where data is opened.

In the case where the data is opened, as shown in FIG. 7, when the state of that data is changed from the close state to the open state (S41 YES), a close RAP segment list is searched through (S42, S43 to S47), and the segment node belonging to that data (S44 YES) is removed from the closed RAP segment list (S45) and inserted at the end of an opened RAP segment list (S46). In addition, a closed normal segment list is searched through (S48, S49–S53), and the segment node belonging to that data (S50 YES) is removed from the closed normal segment list (S51) and inserted at the end of an opened normal segment list (S52).

Figure 8:
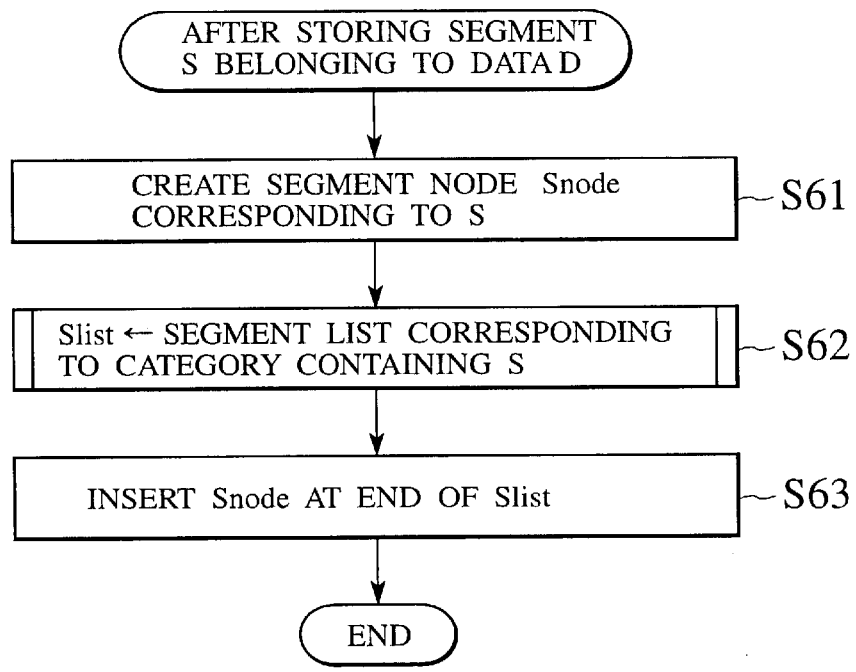
FIG. 8 is a flow chart showing an exemplary operation for updating a data structure at a discarding segment selection unit in the hierarchical storage device of FIG. 1 in the case where a segment is newly stored in a cache.

In the case where a segment is newly stored into the cache, as shown in FIG. 8, a segment node corresponding to that segment is newly created (S61). Then, whether that segment is a RAP segment or not is judged, and the category into which that segment is to be contained is determined (S62). Then, that segment is inserted at the end of the segment list corresponding to the determined category (S63).

Figure 9:
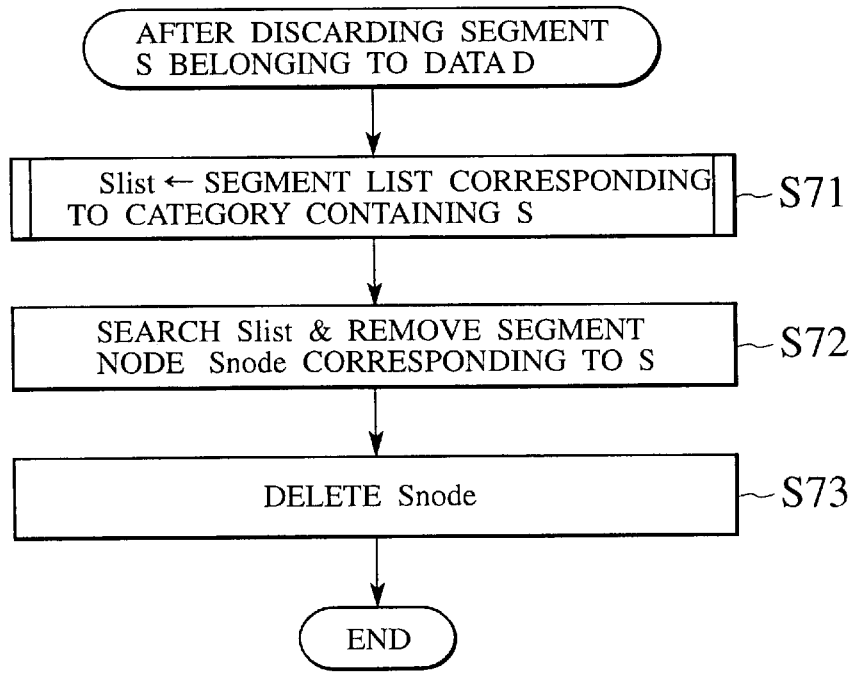
FIG. 9 is a flow chart showing an exemplary operation or updating a data structure at a discarding segment election unit in the hierarchical storage device of FIG. 1 in the case where a segment is discarded from a cache.

In the case where a segment is discarded from the cache, as shown in FIG. 9, whether that segment is a RAP segment or not is judged, and the category into which that segment is to be contained is determined (S71)> Then, the segment list corresponding to the determined category is searched through, and the segment node corresponding to that segment to be discarded is removed from that segment list (S72) and the segment node itself is also deleted (S73).

Figure 10:
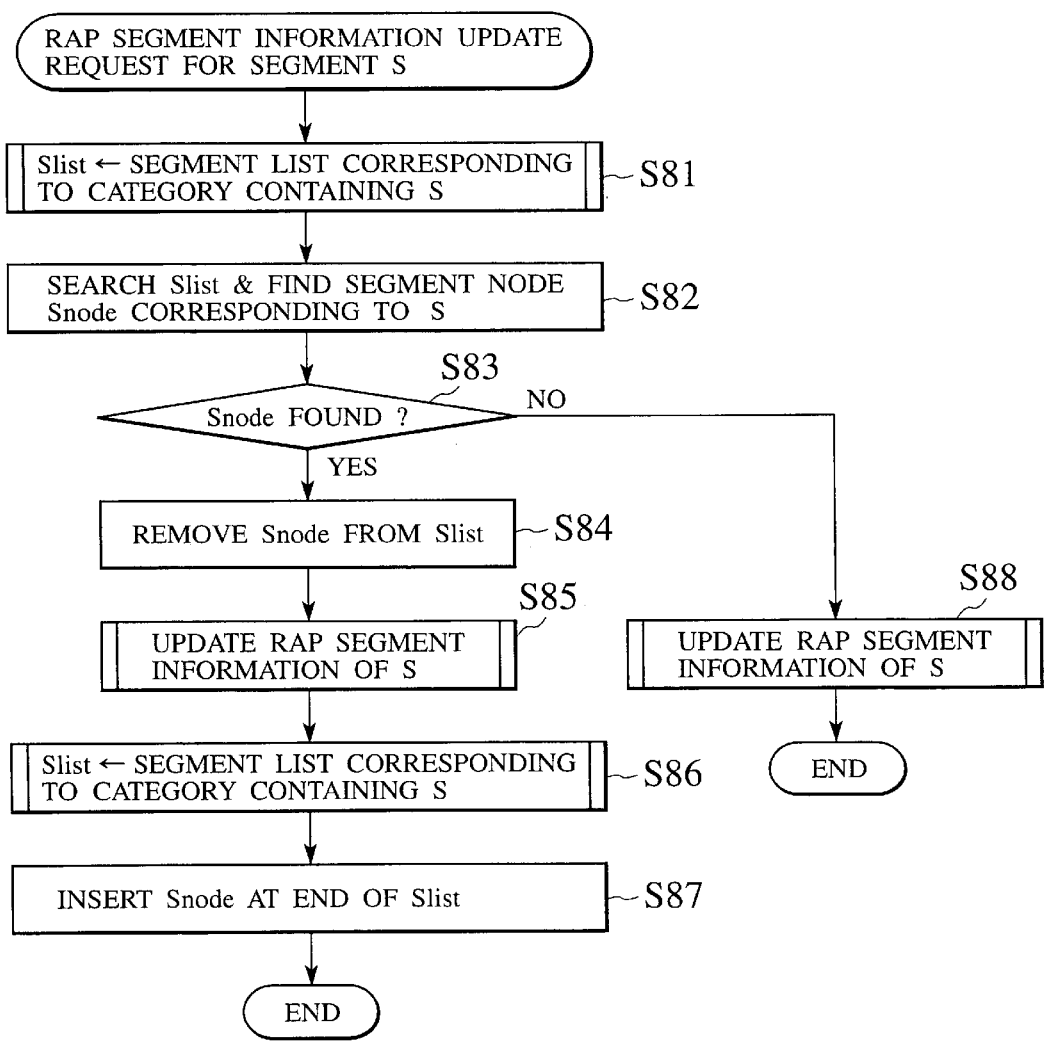
FIG. 10 is a flow chart showing an exemplary operation or updating a data structure at a discarding segment selection unit in the hierarchical storage device of FIG. 1 in the case where a RAP segment information is updated.

In the case where the RAP segment information update request is issued, as shown in FIG. 10, whether that segment was a RAP segment or not is judged according to the RAP segment information before the updating, and the category in which that segment was contained is determined (S81). Then, the segment list corresponding to the determined category is searched through (S82). If that segment is stored in the cache, the segment node corresponding to that segment will be found (S83 YES) so that this segment node is removed from that segment list (S84), the RAP segment information is updated (S85), the category into which that segment is to be contained is determined by judging whether that segment is a RAP segment or not according to the RAP segment information after the updating (S86), and that segment node is re-inserted into the segment list corresponding to the category after the updating (S87). If that segment is not stored in the cache, the segment node corresponding to that segment will not be found (S83 NO) so that the updating of the RAP segment information is simply carried out (S88).

Figure 11:
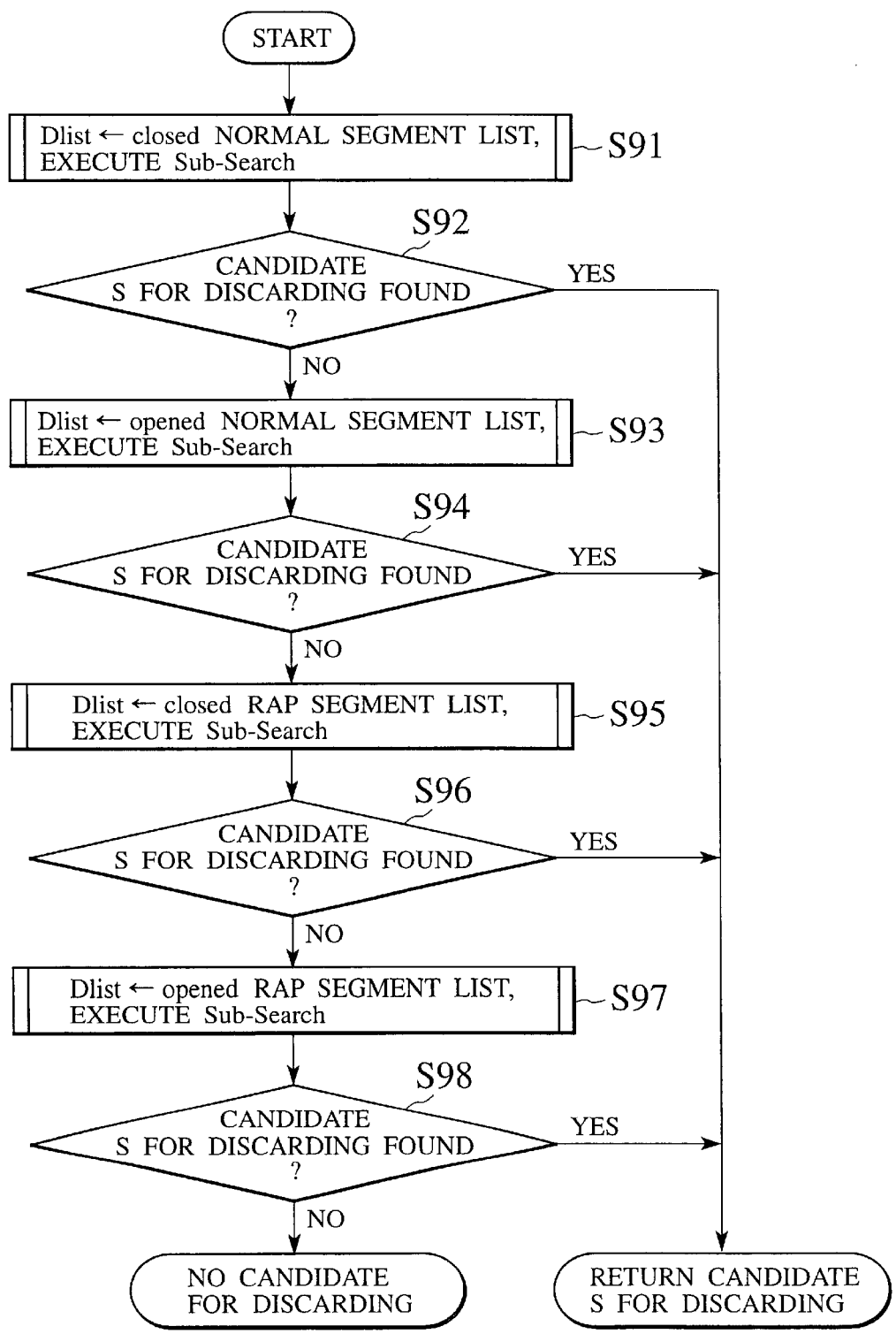
FIG. 11 is a flow chart showing an exemplary operation for sequentially specifying categories in order to select a candidate for discarding from a cache in the hierarchical storage device of FIG. 1.
Figure 12:
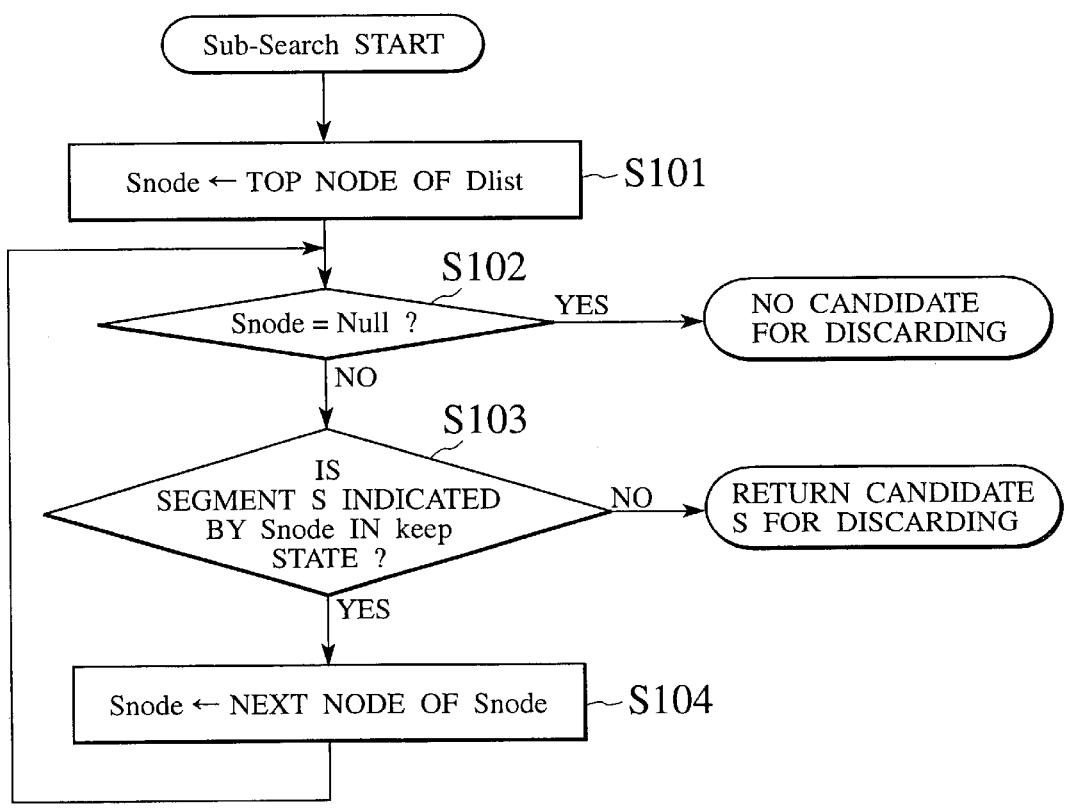
FIG. 12 is a flow chart showing an exemplary operation for searching a segment within a specified category in order to select a candidate for discarding from a cache in the hierarchical storage device of FIG. 1.

At a timing where the selection of the discarding segment becomes necessary, the discarding segment selection unit 17 (or the segment transfer management unit 13) selects the candidate for discarding according to the flow charts of FIG. 11 and FIG. 12.

The category in which the candidate for discarding is to be found is specified in an order of categories (a), (b), (c), and (d) (S91, S92 NO, S93, S94 NO, S95, S96 NO, S97). In order to search the candidate for discarding in the specified category, the segment node is searched from a top of the segment list corresponding to the specified category (S101, S102 to S104), and a segment that is not in the keep state that was found first is selected as the candidate for discarding (S103 NO). When there is a need to discard plural segments, this operation is repeated until as many candidates for discarding as necessary are selected. When a sufficient number of the candidates for discarding are selected in the specified category, the processing is terminated (S92 YES/ S94 YES/S96 YES/S98 YES).

Note that in order to obtain the corresponding segment node from the data identifier and the segment number, it is possible to add a field for storing a pointer to the segment node in each entry of the index table or provide a hash function. In this way, at a time of updating the segment list, it becomes unnecessary to determine the segment list corresponding to the category in which that segment is contained by judging whether it is a RAP segment or not, or to find the segment node by searching through the determined segment list.

Also, when it is assumed that the discarding priority order is higher in an order of the above described categories (a), (b), (c) and (d), there is a possibility for the RAP segments to occupy most of the cache. When this happens, the storing/discarding of normal segments that are not RAP segments will occur frequently except for those segments in the keep state. When the frequency of the segment transfer between the library and the cache increases too much, a problem concerning the durability of mechanical parts of the library may arise. In the case where this problem arises, the discarding priority order can be changed to the order of (a), (c), (b) and (d) if a rate by which the cache is occupied by the RAP segments exceeds a prescribed threshold. In this way, in addition to reducing the response time at a time of the random access, it becomes possible to realize a better balance with respect to the frequency of the segment transfer between the library and the cache.

Here, the exemplary case of using a mechanism for judging whether it is a RAP segment or not as a mechanism for referring to the RAP segment information has been described, but it is also possible to use a form in which the RAP counter value is referred and its size itself is included as a key for the discarding priority order. For example, at a time of selecting the candidate for discarding from the category (c) or (d) that contains the RAP segments, a segment with the smallest RAP counter value among the RAP segments belonging to that category that are not in the keep state can be selected as the candidate for discarding.

More specifically, at a time of inserting the segment nodes into the opened RAP segment list or the closed RAP segment list, the segment nodes can be inserted such that they are sorted in an increasing order of the RAP counter values.

In this concrete example, when the data access request is received, and the sequential accesses are to be made in addition to transferring a segment containing a point pointed by that seek pointer, for example, the segments consecutive to the segment to be accessed are prefetched to the cache as already mentioned above.

In addition, the RAP segments belonging to the data in the open state have a high possibility of being random accessed in near future compared with the other segments. For this reason, the storing segment selection unit 18 is provided with a mechanism for prefetching segments belonging to the category (d) among the above described categories into the cache.

More specifically, as a data structure to be stored for the purpose of managing information necessary at the storing segment selection unit 18, a prefetch list is provided. In the prefetch list, segment nodes of those segments among the RAP segments belonging to the data in the open state which are not yet cached are inserted.

The storing segment selection unit 18 updates this prefetch list at a timing where the state of data or segment is changed. The concrete operation for realizing this function is as follows.

Figure 13:
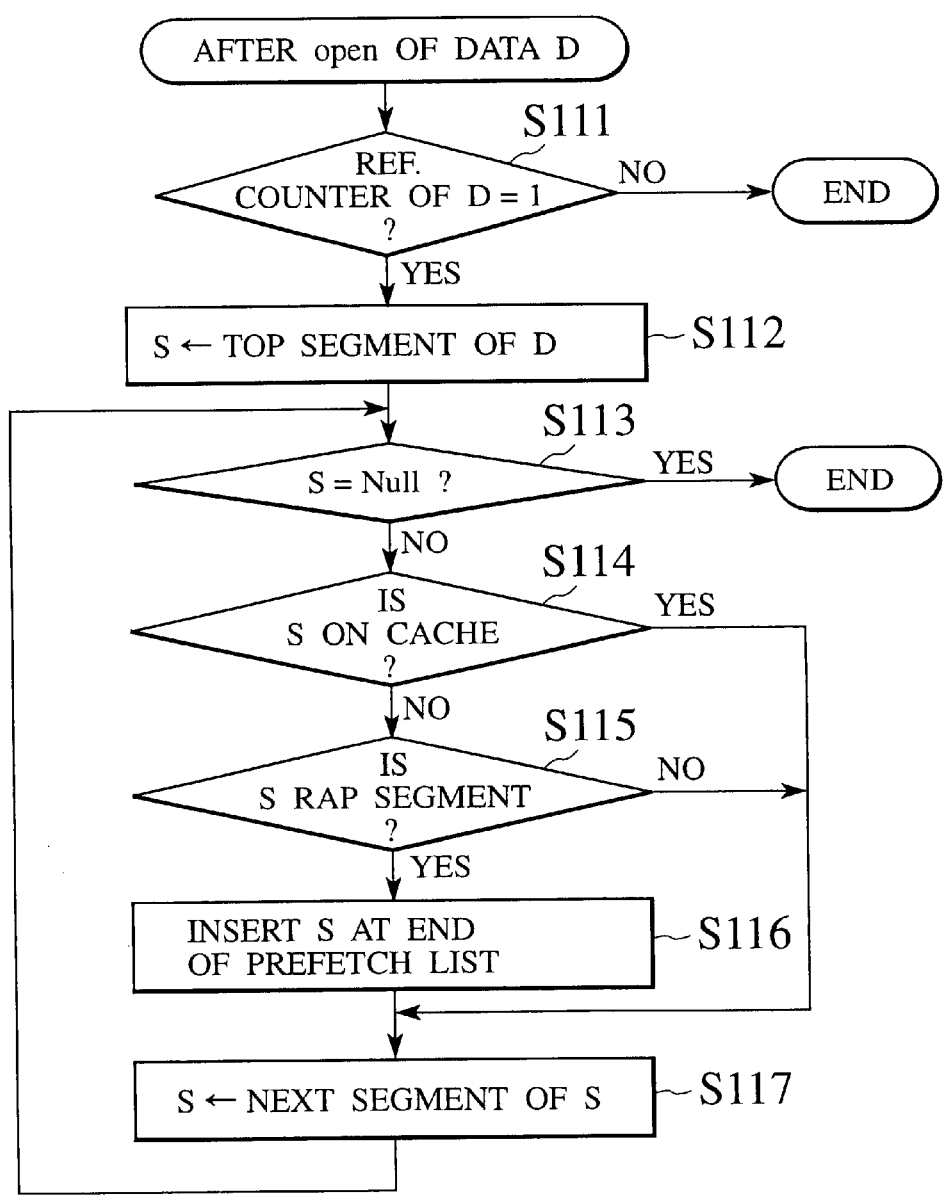
FIG. 13 is a flow chart showing an exemplary operation for updating a data structure at a storing segment selection unit in the hierarchical storage device of FIG. 1 in the case where data is opened.

In the case where the data is opened, as shown in FIG. 13, when the state of that data is changed from the close state to the open state (S111 YES), all the segments belonging to that data are checked (S112, S113 to S117), and those segments which are RAP segments (S115 YES) and not yet stored on the cache (S114 NO) are inserted at the end of the prefetch list (S116).

Figure 14:
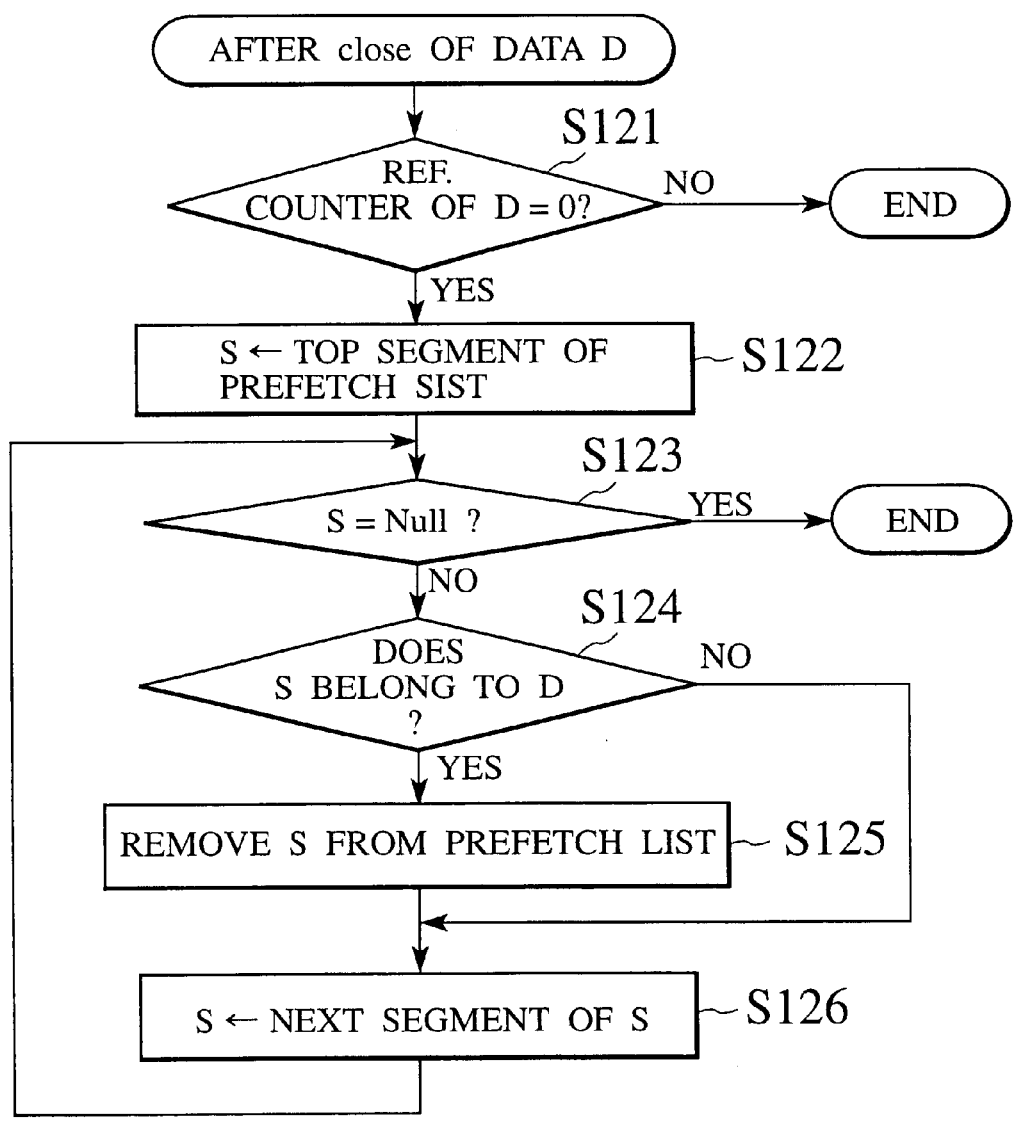
FIG. 14 is a flow chart showing an exemplary operation for updating a data structure at a storing segment selection unit in the hierarchical storage device of FIG. 1 in the case where data is closed.

In the case where the data is closed, as shown in FIG. 14, when the state of that data is changed from the open state to the close state (S121 YES), all the segments that are inserted into the prefetch list are checked (S122, S123 to S126), and if there is any segment that belongs to that data (S124 YES), it is removed (S125).

Figure 15:
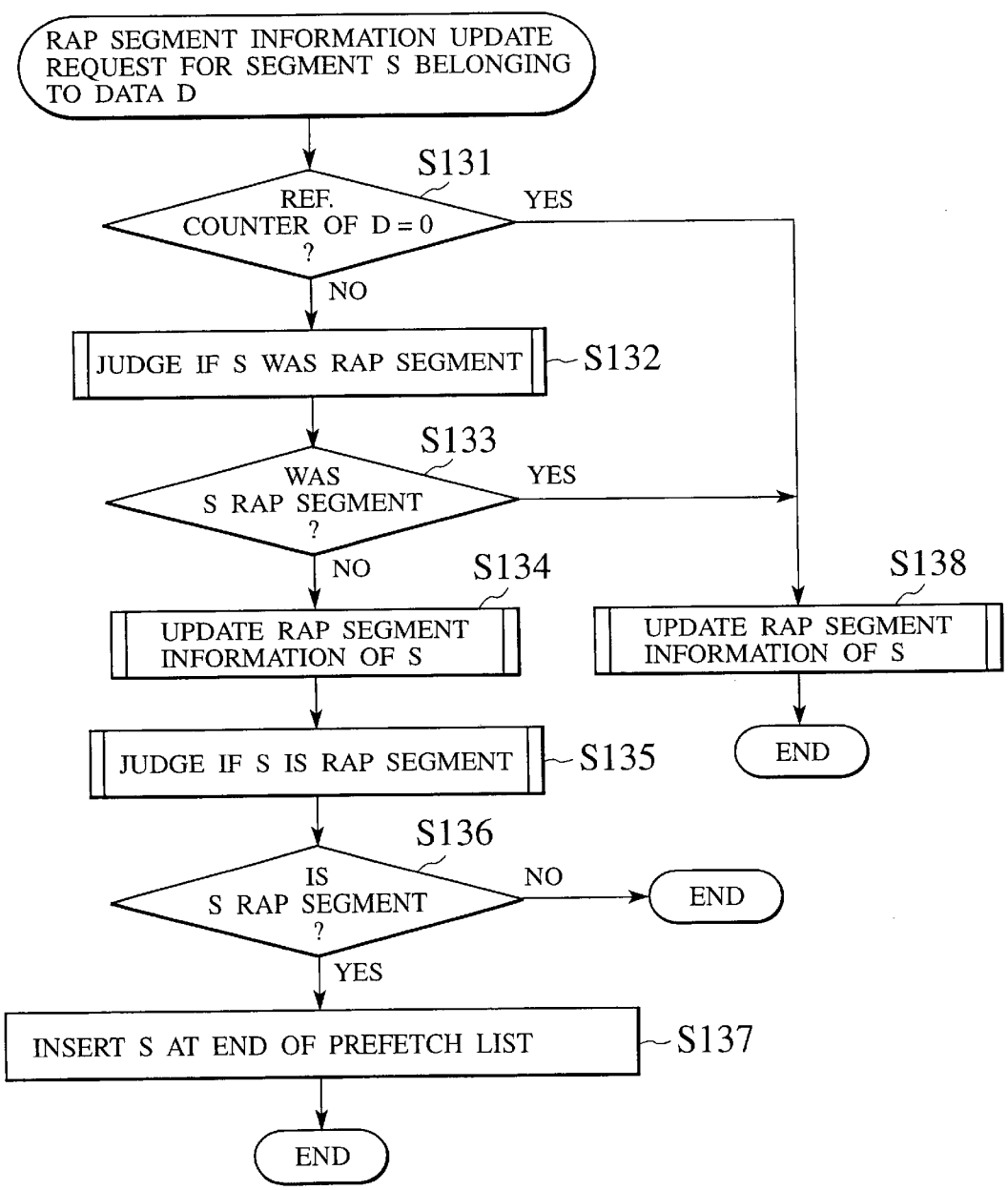
FIG. 15 is a flow chart showing an exemplary operation for updating a data structure at a storing segment selection unit in the hierarchical storage device of FIG. 1 in the case where a RAP segment information is updated.

In the case where the RAP segment information update request is issued, as shown in FIG. 15, if the data is in the open state (S131 NO), whether that segment was a RAP segment or not is judged according to the RAP segment information before the updating (S132), and if it was a RAP segment, it already exists in the prefetch list so that the RAP segment information is updated and the processing is terminated (S138). If the data is in the close state (S131 YES), since it is assumed in this example that the segment is not to be entered into the prefetch list in such a case, the RAP segment information is updated and the processing is terminated similarly (S138). Here, instead of the above described S132, the search through the prefetch list can be carried out and the judgement of S133 can be replaced by the judgement as to whether the segment for which the RAP¢segment information updating is to be carried out is inserted into the prefetch list or not.

If it was not a RAP segment before the updating (S133 NO), the RAP segment information is updated (S134), and whether it is a RAP segment or not is judged according to the RAP segment information after the updating (S135). If it is a RAP segment (S136 YES), the segment that is newly judged as a RAP segment as a result of the updating is inserted at the end of the prefetch list (S137).

The storing segment selection unit 18 judges whether. the segments inserted into the prefetch list are to be stored into the cache or not at a timing where the state of data or segment is changed, and issues the segment transfer request to the segment transfer management unit 13 accordingly.

More specifically, the judgement as to whether or not to store them into the cache is started at a timing where any of the following events occurs, for example.

(1) The keep state of a segment on the cache is released:

(2) Data in the open state is closed so that the state is changed to the close state;

(3) The RAP segment information of a segment belonging to data in the open state is updated;

(4) The segment transfer between the library and the cache is finished; and (5) A segment is newly inserted into an empty prefetch list.

Figure 16:
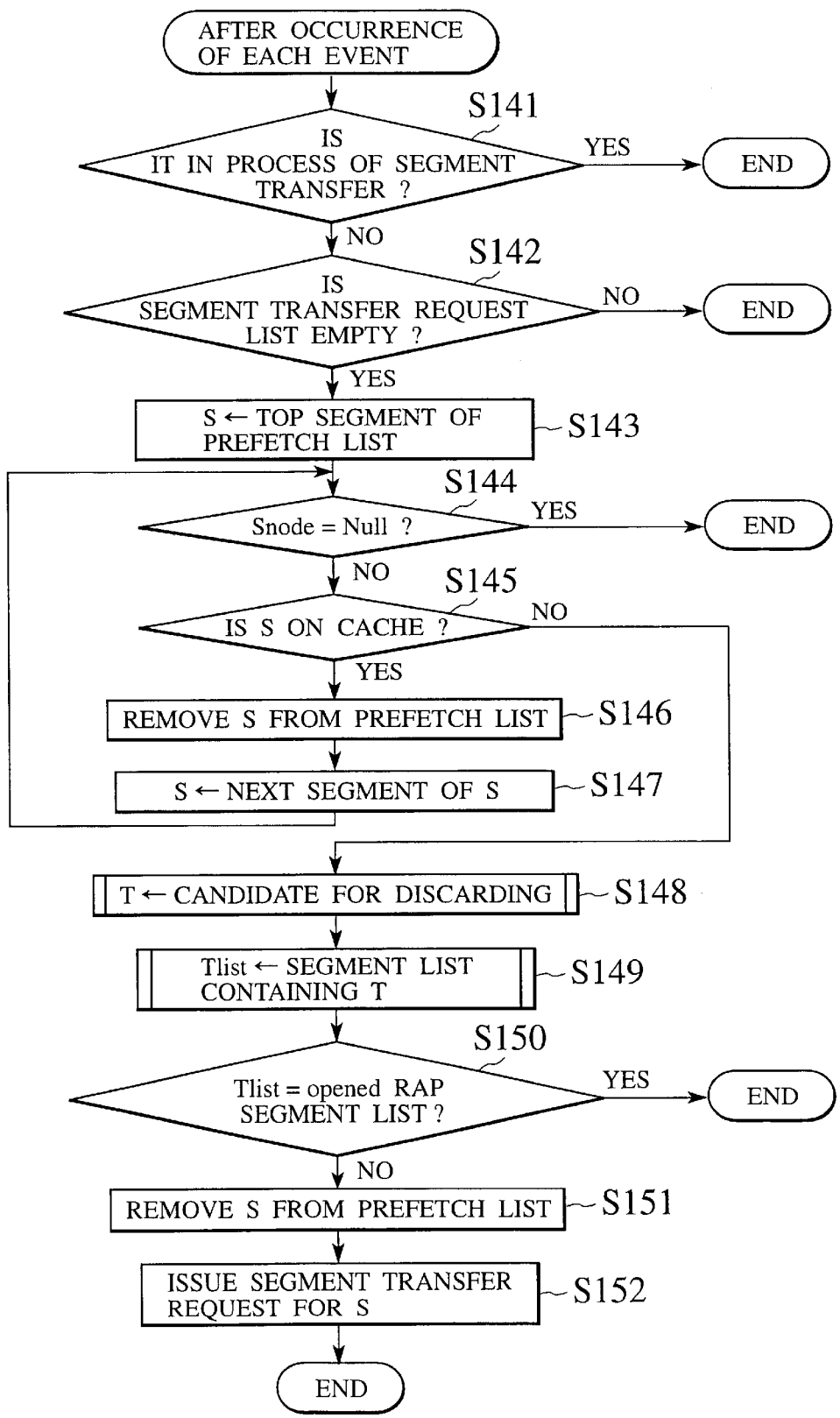
FIG. 16 is a flow chart showing an exemplary operation for judging whether or not to store a prefetch candidate into a cache in the hierarchical storage device of FIG. 1.

The judgement as to whether or not to store segments inserted into the prefetch list in the cache is made according to the flow chart of FIG. 16 as follows.

First, whether the condition that it is not in a process of the segment transfer at that moment (S141 NO) and there is no segment transfer request to be executed next (S142 YES) is satified or not is checked. If this condition is not satisfied the processing is terminated. If this condition is satisfied, the prefetch list is searched through from the top (S143, S144 to S147), and if there is a segment stored in the cache (step S145 YES), this segment is removed from the prefetch list (S146). This operation is repeated until a segment that is not stored in the cache is found, and if no such segment is found the processing is terminated.

When a segment that is not stored in the cache is found in the prefetch list (S145 NO), the candidate for discarding from the cache is selected next (S148), and whether that candidate for discarding is contained in the category (d) or not is checked (S149). If it is not contained (S150 NO), the prefetch target segment transfer request is issued in order to replace this candidate for discarding by the segment found from the prefetch list (S152), and that segment is removed from the prefetch list (S151). If it is contained (S150 YES), the processing is terminated. Here, the segment that is in the keep state will not be selected as the candidate for discarding from the cache.

Note that, in this, RAP segment prefetch operation, the segments stored into the cache by the prefetching are not set in the keep state.

In the above example, the segment transfer request is issued in an order of times at which the segments are inserted into the prefetch list (FIFO), but instead of that, it is also possible to issue the segment transfer request at higher priority for the RAP segment which has a higher possibility of being random accessed.

To this end, at a time of inserting the RAP segment into the prefetch list at the above described timing, for example, the RAP counter of that RAP segment can be referred and the RAP segment can be inserted into the prefetch list such that the segments are arranged in a decreasing order of the RAP counter values.

More specifically, the RAP counter is referred sequentially from the segment at the end of the prefetch list, and compared with the RAP counter value of the segment to be inserted. When a segment having the RAP counter value that is greater than or equal to the RAP counter value of the segment to be inserted is found, the segment to be inserted is inserted behind that segment.

Note that, when the RAP counter of the segment inserted into the prefetch list is updated, it is possible to temporarily have a situation where the order in the prefetch list is not a decreasing order of the RAP counter values. However, in the case of updating the RAP counter by the method described above, the segment is highly likely to be in the keep state in a situation where its RAP counter is to be updated, so that it can be assumed that such a segment is not inserted into the prefetch list in most cases. For this reason, in this example, the temporal disturbance of the order in the prefetch list can be ignored. In the case where it is not ignorable, it suffices to sort the segments inserted into the prefetch list according to the RAP counter values at appropriate timing.

Also, in the case where the linear search through the prefetch list causes the problem regarding the execution speed, it is possible to use the faster implementation by realizing the prefetch list as B+tree, for example.

According to what is described above, a segment of data that is not opened or a normal segment that is not RAP segment can be replaced by the RAP segment of opened data, according to the types and the states of the segments stored on the cache As described, according to this first embodiment, which portion of data has a high possibility of becoming a random access point subsequently can be estimated from the tendency of the data operations such as the seek request and the access request, and this information can be stored as the RAP segment information. By utilizing the RAP segment information, when there is a need to discard segments on the cache, it is possible to realize the operation which leaves the RAP segments on the cache as much as possible. Also, when a certain data is opened, it is possible to realize the operation which prefetches the RAP segments into the cache. Consequently, it becomes possible to improve the cache hit rate at a time of the random access which has properties different from the normal sequential access, and as a result, it becomes possible to reduce the average response time at a time of the random access.

Referring now to FIG. 17 to FIGS. 27A and 27B, the second embodiment of the present invention which is directed to the data playback scheme will be described in detail.

The data playback device according to this second embodiment provides, in addition to a basic mechanism for recording and playbacking video data or audio data, the following mechanisms.

A mechanism for automatically detecting a playback start position that can potentially be a playback start index, and recording the detected position as the playback start index;

A mechanism for assigning the priority order among the recorded indexes;

A mechanism for index based playback in which an index is selected from a list of recorded indexes and the data playback is started from a position indicated by the selected index;

A mechanism by which an operator explicitly records an index; and

A mechanism for editing and deleting the recorded indexes.

In the following, the overall configuration and each constituent element of the data playback device according to this second embodiment are described first, and then the management method and the utilization method of the indexes provided by this data playback device will be described. After that, the cooperative operations of the constituent elements that are initiated by the user operation will be described for some concrete examples.

First, the playback start index and the playback start index list to be used in this second embodiment will be described.

The playback start index is an information for indicating a playback start position, which is to be referred at a time of starting the playback by specifying the playback start position of data to be playbacked by the data playback device. Using the playback start index, the operator can quickly call up a scene that he/she wishes to see later on. The playback start index contains elements such as "index ID" for uniquely identifying the playback start index, "data ID" for specifying a target data of the playback start index, "seek point" indicating a playback start address of that data, "recording time (recording date)", "reference count", and "index name" of the playback start index, and "protection flag" for preventing the playback start index from being inadvertently deleted.

On the other hand, the playback start index list is a set of a plurality of playback start index, which is managed as a list structure or a table (see FIG. 18).

Figure 17:
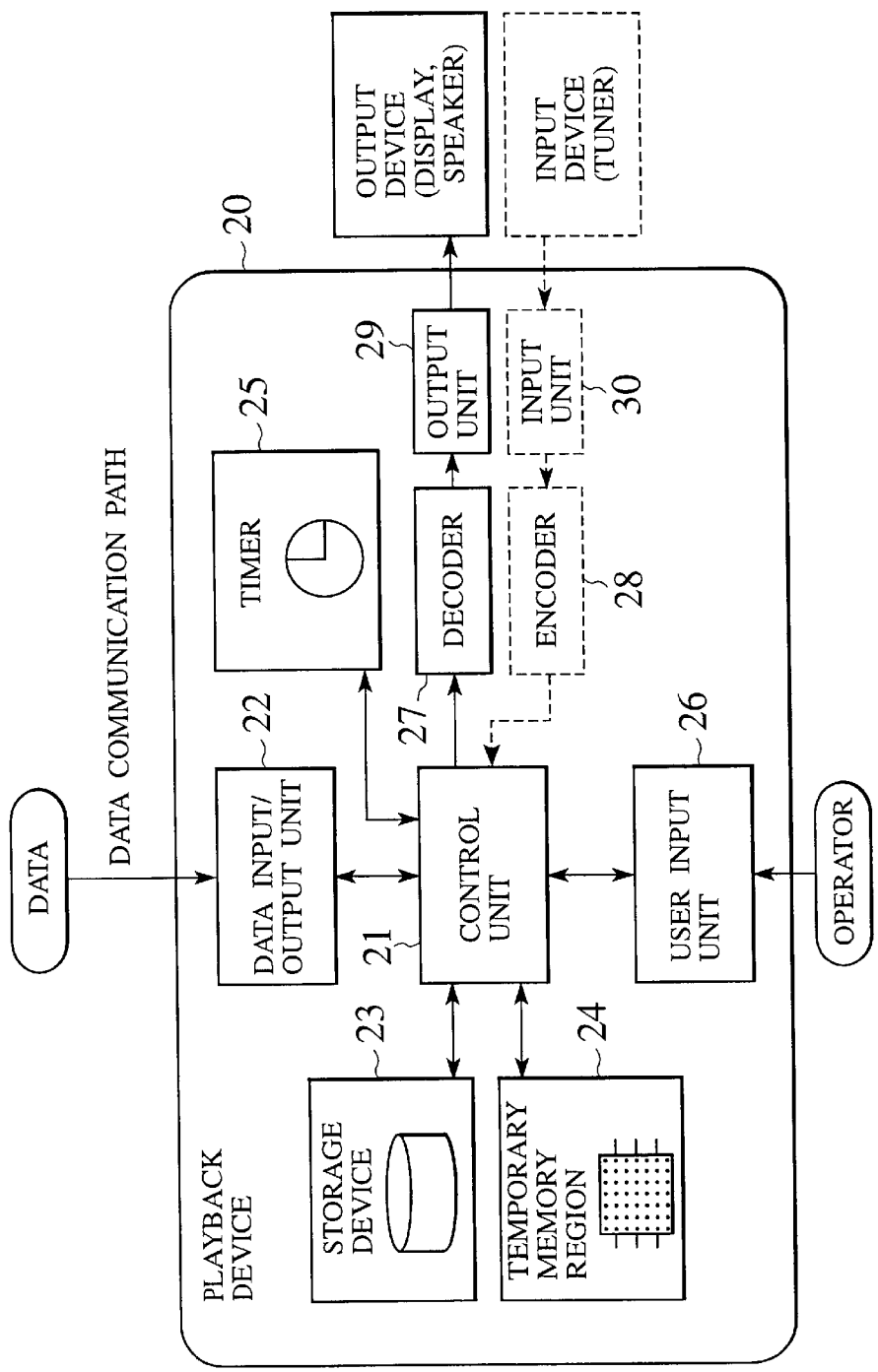
FIG. 17 is a block diagram showing an exemplary configuration of a data playback device according to the second embodiment of the present invention.

FIG. 17 shows an exemplary configuration of the data playback device 20 according to this second embodiment, which comprises a control unit 21, a data input/output unit 22 connected to a data communication path, a storage device 23, a temporary memory region 24, a timer 25, a user input unit 26 for receiving inputs from an operator, a decoder 27, and an output unit 29 connected to an output device such as display and speaker. According to the need, the data playback device 20 may also comprise an encoder 28, and an input unit 30 connected to an input device such as tuner.

The control unit 21 is formed by a software and a CPU for executing that software, and carries out the following operations.

Detection of an index that can potentially be a playback start position;

Assigning the priority order among the indexes;

Processing of user inputs from the user input unit 26;

Construction of a display screen as a user interface;

Read/write of the playback start index list with respect to the storage device 23;

Read/write of temporary stored data with respect to the temporary memory region 24;

Control of the timer 25;

Transmission and reception of request and data with respect to the data input/output unit 22;

Data output to the output unit 29; and

Data input from the input unit 30.

The software of the control unit 21 is stored in the storage device 23, from which the necessary portion is read into the temporary memory region 24 by the operating system stored in the storage device 23.

The data input/output unit 22 is a unit for handling a request with respect to the external storage device and read/write of data recorded in the external storage device through the data communication path. For example, in the case where this data playback device is used as a client that carries out read/write of data with respect to a storage device (which can be the hierarchical storage device of FIG. 1 or the other type of server device) that functions as a server through a network, the data input/output unit 22 is formed by a network interface and its control software, and carries out transmission and reception of request and data with respect to the server.

The storage device 23 is a unit for recording data to be used permanently, which is formed by a hard disk, non-volatile RAM, etc., so that its content can be maintained even when the power of this data playback device is turned off. What is stored in the storage device 23 includes the software for the control unit 21 and the playback start index list. The content recorded in the storage device 23 is read and transmitted to the control unit 21 in response to a request from the control unit 21, or information from the control unit 21 is received and written into the storage device 23.

As a mechanism by which the control unit 21 handles the playback start index list in the storage device 23, the following functions are provided.

Acquisition of playback start indexes either individually or collectively;

Incrementing the reference count of the playback start index; and

Registration of the playback start index.

The temporary memory region 24 is a unit for recording data to be temporarily used by the control unit 21. There is no need to maintain the content recorded in the temporary memory region 24 when the power of this data playback device is turned off, but it is required to be capable of being accessed fast so that it is formed by RAM or the like. The temporary memory region 24 stores the software of the control unit 21, and provides a work area for the software of the control unit 21. In this work area, the cache data of the playback start index list, the playback position information for the purpose of the automatic detection of the playback start index, etc., are recorded. The software of the control unit 21 is read into the temporary memory region 24 from the storage device 23 when the software becomes necessary, such as when the power of this data playback device is turned on.

The timer 25 is driven by an external clock and the value of a counter provided in the timer is sequentially incremented. The timer 25 is used by the control unit 21 at a time of detecting the playback position that can potentially be the playback start index. The control unit 21 carries out the zero resetting and the reading of the counter value maintained in the timer 25.

The user input unit 26 is a unit for notifying the operation inputs entered by the operator into this data playback device, to the control unit 21. The user input unit 26 is formed by an electric input device having buttons, cursor keys, a return key, etc., for calling up the operation mechanism provided at this data playback device, and a converter for the purpose of notifying that input to the control unit 21. As a more advanced configuration, the input device can be replaced by mouse, keyboard, or software keyboard.

The decoder 27 is a unit for decoding/developing audio/video data transmitted from the control unit 21 and configuration data of the display screen as the user interface which is produced by the control unit 21, and sending them to the output unit 29.

The encoder 28 is a unit for encoding audio/video data transmitted from the input unit 30 and sending them to the control unit 21.

The portion that decodes/encodes the audio/video data in the decoder 27 and the encoder 28 can be formed by either software or hardware. In the case of forming them by hardware, circuits for realizing these functions are incorporated. In the case of forming them by software, the software, CPU for executing the software, RAM to provide a memory region, and a storage device for recording the operating system are incorporated. Here, CPU, RAM and the storage device can be shared with those of the control unit 21.

The output unit 29 is a unit for outputting data decoded/developed by the decoder 27 to the output device such as display and speaker. The output unit 29 is formed by circuits for converting the output of the decoder 27 into a format that can be handled by the output target device.

The input unit 30 is a unit for inputting the inputs from the input device such as tuner into the encoder 28. The input unit 30 is formed by circuits for converting the input of the input device into a format that can be handled by the encoder 28. Note that it is not absolutely necessary to provide this data playback device with the encoder and the input unit, and when they are not used, this data playback device functions as a dedicated device for the playback.

Next, the outline of the automatic playback start index detection, the method for determining the priority order in the playback start index list, and the basic operation of the user interface for the index selection in the data playback device of this second embodiment will be described.

Figure 19:
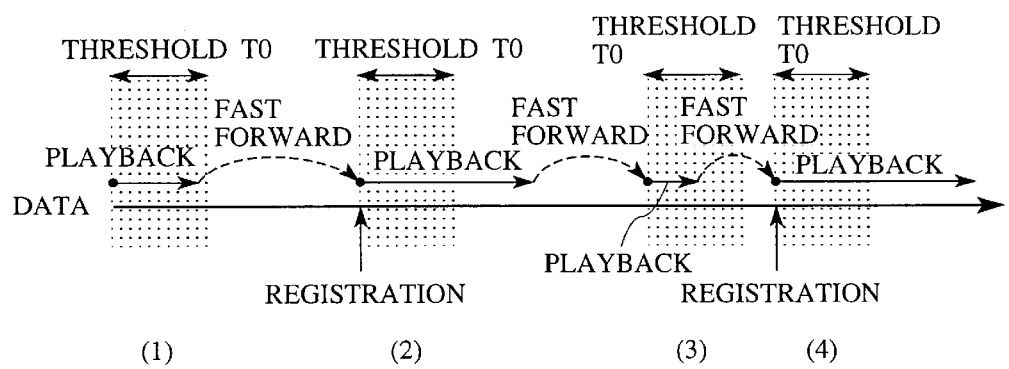
FIG. 19 is a diagram showing an outline of a method for detecting a seek point that can potentially be a playback start index used in the data playback device of FIG. 17.

First, with reference to FIG. 19, the method for automatically detecting the seek points that can potentially be the playback start indexes and recording them as the index list in the storage device 23 will be described.

The data playback devices including the data playback device of this second embodiment as well as the conventional playback devices are provided with the basic operation mechanism such as playback, stop, fast forward, reverse (rewind), etc., as the control mechanism for the playback. In general, the operator searches out a scene that he/she wishes to playback from the data using such operation mechanism. At that point, the operator carries out the rough data operation using fast forward and fast reverse modes first, and then starts the normal playback. If the playbacked scene is the desired scene of the operator, the playback is continued from there on, whereas otherwise the fast forward and fast reverse modes are carried out again.

In other words, the detection of the seek point that can potentially be the playback start index can be realized detecting the seek points (the second and fourth playback start points in FIG. 19) at which the playback continuing for a period longer than a prescribed threshold T0 has been started while the operator carries out operations in a pattern as described above.

In this data playback device, there is provided a mechanism for generating the playback start indexes from the seek points detected as described above, and recording them into the storage device 23. The number of indexes that can be recorded can vary depending on the capacity of the storage device 23 for recording the index list.

There is also provided an operation mechanism for the index based playback in which the operator refers to the playback start index list later on to select one playback start index from the list, and the playback from that seek point is carried out.

The detection of the seek points that can potentially be the playback start indexes in this data playback device as described above is based on the same principle as the detection of a top of the sequential accesses (playback start point) in the case where the sequential access (playback) amount is large (FIG. 2C) in the hierarchical storage device of FIG. 1. Namely, in the hierarchical storage device of FIG. 1, by updating the RAP segment information of a point that satisfies the condition as shown in FIG. 2C and controlling such that the probability for segments containing the RAP candidates to exist in the cache becomes high, the response time in the case where the user subsequently specifies the playback from arbitrary position in a middle of the contents is shortened at the server device side. On the other hand, in this data playback device, a point that satisfies the condition (shown in FIG. 19) similar to that shown in FIG. 2C is recorded as a past record (playback start index list) at the client device side when the user carries out the initial search, so that it becomes possible to quickly call up the desired scene to be playbacked by utilizing that record subsequently.

Next, the method for determining the priority order among the playback start indexes in the index list will be described. In determining the priority order, the order of the following indexes can be raised in the list, for example.

Those playback start indexes that are newly recorded (Freshness);

Those playback start indexes that are selected many times (Reference count); and Those playback start indexes that are explicitly added to the list by the operator.

At a time of automatically recording the playback start indexes when the operator playbacked for a period longer than the threshold after the seek operation, or at a time when the operator started the index based playback using the already recorded playback start index, this data playback device records the last reference time of that playback start position and increments the reference count. At a time of displaying the playback start index list such as at a time of carrying out the index based playback or at a time of editing the indexes, the indexes are displayed in an order according to the priority order determined by these two parameters. Which one of these two parameters, the recording time and the reference count, should be given more weight depends on the type of use of this data playback device.

For example, in the case where it is expected that the immediately previously referred playback start position will be frequently utilized as in the case of information which is repeatedly referred at high frequency, the weight of the recording time (freshness) parameter is made heavier. On the contrary, in the case where it is expected that the playback start position that was selected many times in the past will has a high possibility of being selected as in the case where there are only few scenes from which the playback start position can be selected, the weight of the referenced count parameter is made heavier.

Also, it can be expected that those playback start indexes that are explicitly added to the list by the operator have a high possibility of being referred subsequently so that they are recorded in the list at the high priority order in advance.

Finally, the basic operation of the user interface at a time where the operator selects the playback start index will be described.

Figure 22:
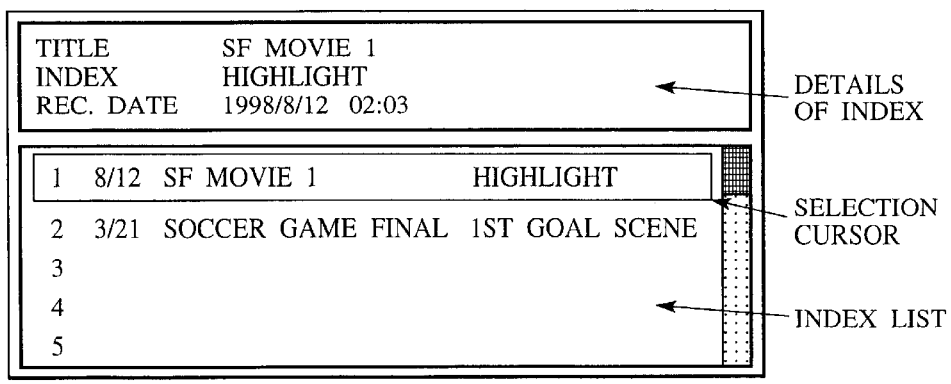
FIG. 22 is a diagram showing an exemplary configuration of a selection display screen that can be used in the data playback device of FIG. 17.

When the operator carries out the operation to call up the playback start index selection screen with respect to this data playback device using the remote controller or the like, the index list as shown in FIG. 22 is displayed on the screen. This list is displayed in a decreasing order of the priority order determined by the above described parameters. The number of playback start indexes to be displayed can be changed depending on the resolution of the display screen or the type of use of this data playback device. When the detailed information of the playback start index cannot be completely displayed on the list for the reason such as the low resolution of the display screen, the detailed information of the playback start index pointed by a cursor is displayed at a display region provided at an upper portion of the screen.

The operator moves a cursor on the screen using cursor keys (keyboard), a mouse, etc., to set the cursor at the desired playback start index in the displayed list, and presses the return key so as to affirm the selection. When the operator finishes the playback start index selection, the data playback device starts the data playback from the seek point pointed by that index.

In the following, concrete examples of the data playback device of this second embodiment will be described. As a first example, the case of the stream playback through a network based on the server/client scheme will be described, and as a second example, the case of handling data recorded on a freely detachable external removable storage medium such as video cassette or DVD will be described.

First, the first example which is directed to the case of using this data playback device as a network client type recording and playback device for receiving and playbacking the video information from the storage device that functions as a server through a network will be described.

Figure 20:
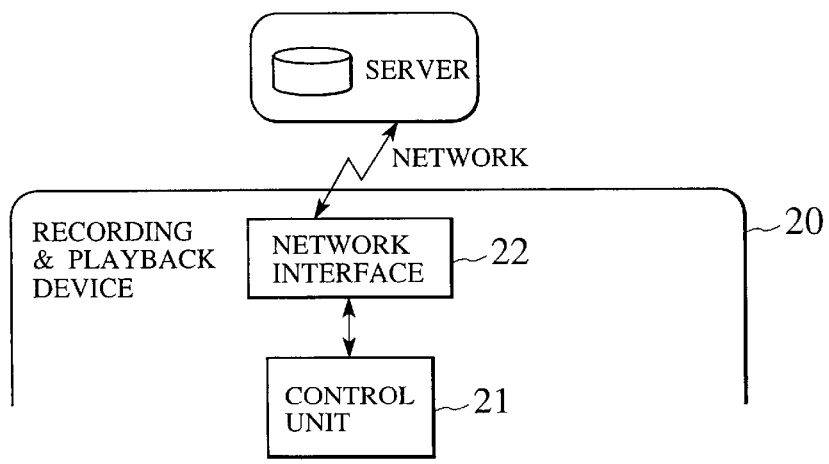
FIG. 20 is a schematic diagram showing an exemplary system configuration for the data playback device of FIG. 17 in the case of playbacking/recording data through a network.
Figure 21:
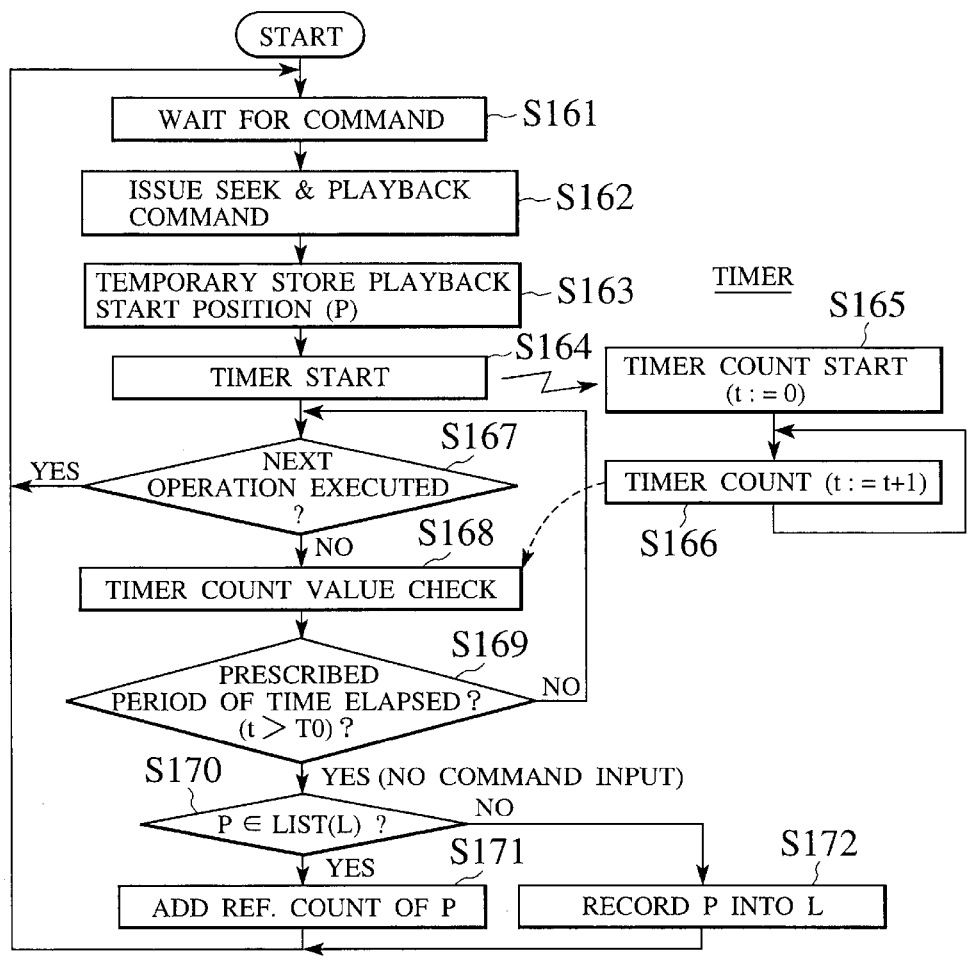
FIG. 21 is a flow chart showing an exemplary automatic playback start index registration processing in the data playback device of FIG. 17.

In this example, as shown in FIG. 20, the data input/output unit 22 of FIG. 17 is provided in a form of a network interface 22, which also contains a software for controlling it. This data playback device carries out transmission and reception of request and data with respect to the server through this interface.

This data playback device has the operation mechanism for operations including playback/index based playback, stop/pause, fast forward, fast reverse (rewind), index attaching, and index editing. At a time of notifying these operations to the server, these operations may be converted into the file operation requests such as "open", "seek", "read", "write", "close", etc. described in the first embodiment. In addition in the case where the data playback device is provided with the encoder and the input unit, the recording can be made. In the case where the server is provided with an equivalent device for recording, it suffices to carry out the recording using the encoder and the input unit of the server so that it is not absolutely necessary to provide this data playback device with the encoder and the input unit.

In the case of the normal playback, when the operator carries out the operation for the playback start, the user input unit 26 notifies that input to the control unit 21, and the control unit 21 issues a data transfer request to the server through the data input/output unit 22. The data transfer request contains the data identifier and the reading start position. The server reads out the specified data starting from the received reading start position from the storage device of the server, and transfers the data to the data input/output unit 22. The control unit 21 transfers the data received from the data input/output unit 22 to the decoder 27. The decoder 27 sequentially decodes the data, and outputs them to the output device such as display or speaker through the output unit 29.

At the same time as the above described playback start operation, the control unit 21 starts the judgement as to whether a position from which the playback is started is a desired seek point of the operator that should be recorded as the playback start index or not. The procedure for this judgement operation will now be described with reference to FIG. 21.

First, this data playback device is in a command waiting state in which the input from the operator is to be received (S161). Then, the input for the operation of fast forward/reverse (seek) and the operation of playback made by the operator with respect to the user input unit 26 are notified to the control unit 21 (S162). Upon receiving the input, the control unit 21 records a value P of the seek point from which the playback is started in the temporary memory region 24 (S163). Then, the control unit 21 activates the timer 25 (S164), and the timer 25 starts counting (S165). The timer 25 increments the count value t maintained therein at a prescribed interval (S166).

The control unit 21 carries out the normal playback operation until the operation to change the playback state such as that of stop or seek by the operator is notified from the user input unit 26. At the same time as the playback operation, the count value t of the timer 25 is continually compared with a prescribed threshold T0 S167 NO, S168). In the case where the operation to change the playback state is carried out before the count value t becomes greater than the threshold T0 (S169 NO, S167 YES), it is judged that the seek point P is not the playback start index to be recorded, so that the timer 25 is stopped and the processing proceeds to the next operation (S161).

When a state of having no input for the operation to change the playback state continues and the count value t of the timer 25 exceeds the threshold T0 (S169 YES), the control unit 21 judges that the seek point P from which the playback is started by the operator is a seek point indicating the desired scene of the operator. Here, for the threshold T0, arbitrarily value can be set for the sake of the convenience of the operator.

Next, the control unit 21 checks whether the playback start index having the same value as the value of the seek point P is contained in the index list L in the storage device 23 or not (S170). If the playback start index with the seek point value P is already contained in the list L, the control unit 21 increments the reference count of that playback start index, which will be used as a parameter for determining the priority order in the index list as described below (S171). If the playback start index with the seek point value P is not contained in the list L, the playback start index I is generated from the seek point P at the control unit 21, entered into the list L, and recorded in the storage device 23 (S172).

The generation of the playback start index I is done by generating the following elements at the control unit 21 from the seek point P: an index ID (a value capable of uniquely identifying the index in the list is generated at the control unit 21), a data ID (an identifier of the playbacked data), a seek point P, a recording time, a reference count (initial value 1), an index name (generated at the control unit 21), and a protection flag.

The index name is generated from the data ID, the seek point, and the recording time at the control unit 21 unless it is explicitly specified by the operator, and recorded in the storage device 23. The operator can edit these information later on.

The protection flag is a flag for preventing the playback start index from being deleted automatically. In the case of the registration based on the automatic detection, it is registered in a state capable of being deleted from the storage device automatically when the priority order becomes low.

In this example, available schemes for recording the playback start index list include a scheme for recording it in the removable storage medium/storage device provided at this data playback device as described above and a scheme for recording it in the storage device (server) which is connected to the network and which has the audio information and the video information. The playback start index recorded in the server can be utilized from other data playback devices that are connected to the server.

In the scheme for recording the playback start index list in the server, the following operations are carried out by transmitting and receiving request and data with respect to the server through the data input/output unit 22.

Acquisition of the playback start index either individually or collectively;

Checking as to whether the playback start index having the seek point with the same value as some seek point value is contained in the list or not;

Incrementing the reference count of the playback start index; and

Registration of the playback start index.

In the playback start index list recorded in the server, there is no need to have the priority order assigned, and the priority order is determined when the list is read by the control unit 21 of the client side (this data playback device) by scanning through its content.

By recording the playback start index list in the server, it becomes possible to share the playback start indexes with the other operators using the other data playback devices, and it also becomes possible to refer to the usually used playback start index list when the operator is using a plurality of data playback devices. The content of the playback start indexes read from the server may be cached in the temporary memory region 24 in this data playback device so as to lower the load of the communication with the server.

Next, the case of the index based playback will be described. The index based playback is introduced in this embodiment for the first time by using the operation mechanism for the normal playback with the playback start position specification added. When the operator carries out the operation for the playback start index selection, as shown in FIG. 22, the index list is displayed on the display screen of this data playback device. The method for acquiring the index list will be described later on. The operator selects the desired playback start index from the acquired list.

The control unit 21 issues a seek request with respect to the server by setting the seek point pointed by the playback start index selected by the operator as argument, and then issues a data transfer request. The server moves the playback start position to the specified seek point, and starts the data transfer with respect to this data playback device starting from that position. At this point, if the server is the hierarchical storage device of FIG. 1 which has left or prefetched a segment containing that playback start position in the cache by detecting the RAP candidates according to the principle similar to that of the playback start index detection, the response time with respect to the data transfer request from this data playback device can be shortened.

When the playback start index is selected, the control unit 21 increments the reference count of the selected playback start index that is recorded in the storage device 23.

When the operator carries out the operation for the stop or the pause, the control unit 21 issues the data transfer ending request with respect to the server through the data input/output unit 22. Here, in order to enable the server to distinguish the normal playback stop and the pause, a flag for distinguishing them is included in the request.

The fast forward is the operation mechanism for playbacking data in short time, which is to be used by the operator in skipping unnecessary scenes or searching a desired scene quickly. As a scheme for realizing the fast forward, a scheme for raising the data transfer rate and a skip scheme are available.

Figure 23:
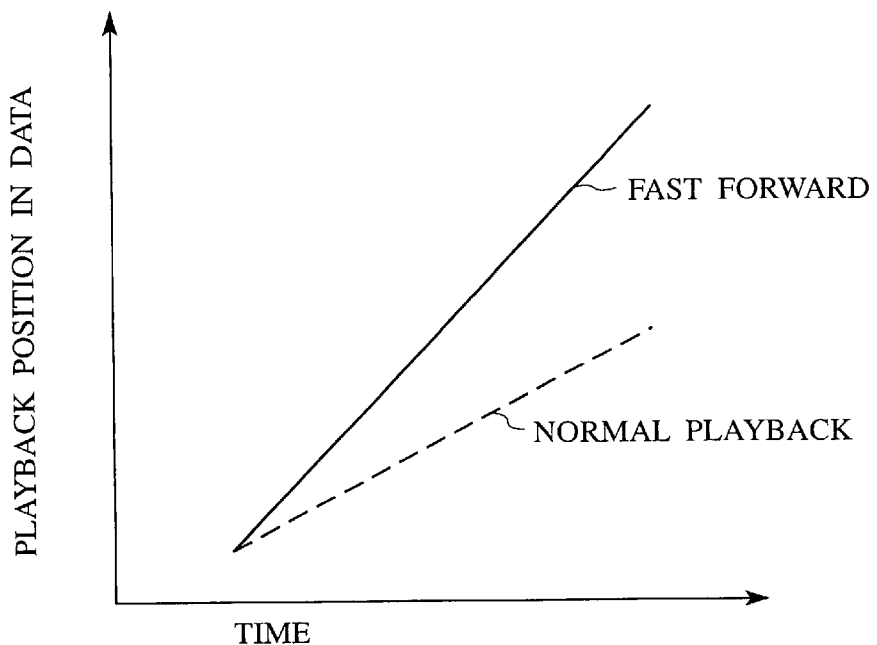
FIG. 23 is a graph showing a shift of a playback position in the case of fast forward according to a scheme for raising a data transfer rate in the data playback device of FIG. 17.

In the scheme for raising the data transfer rate, the fast forward is realized by increasing an amount of data transferred within a given period of time. In the fast forward realized by the scheme for raising the data transfer rate, a playback position is shifted as shown in FIG. 23. When the operator carries out the operation for the fast forward, the control unit 21 issues a request for specifying a rate by which the playback is to be made faster with respect to the server through the data input/output unit 22. The server transfers data to this data playback device at the specified data transfer rate.

Figure 24:
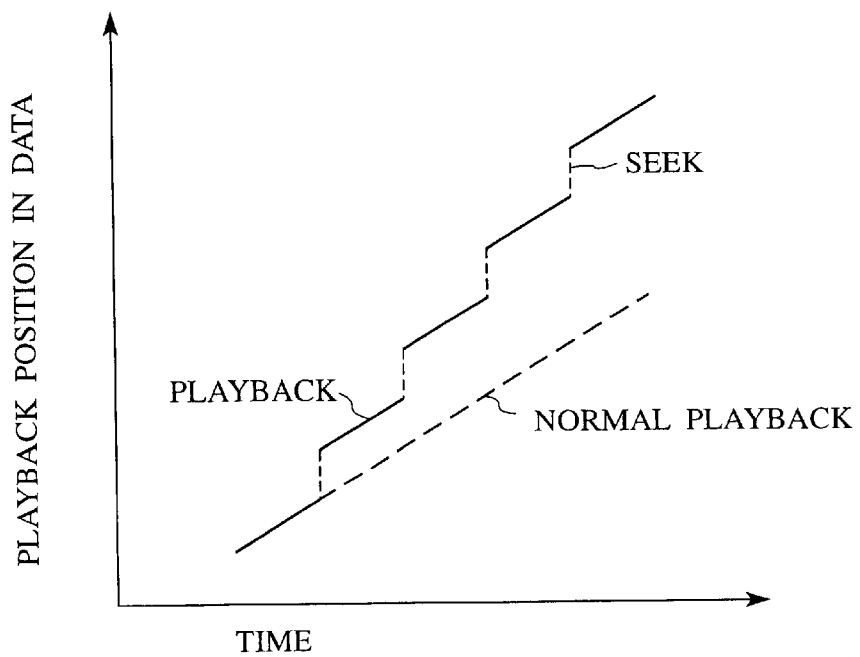
FIG. 24 is a graph showing a shift of a playback position in the case of fast forward according to a skip scheme in the data playback device of FIG. 17.

In the skip scheme, the fast forward is realized by issuing the seek request, the playback request, and the stop request repeatedly, without changing an amount of data processed within a given period of time. In the fast forward realized by the skip scheme, a playback position is shifted as shown in FIG. 24. When the operator carries out the operation for the fast forward, the control unit 21 repeatedly issues the seek request, the playback request, and the stop request with respect to the server through the data input/output unit 22. The server changes a data reading position and transfers data to this data playback device according to these requests. Note that, in this skip scheme, the received data are thinned data, so that this scheme is applicable only to the case using a data format in which data can be interpreted from a middle of the data without interpreting entire data forwards.

The fast reverse is the operation mechanism for playbacking data backwards in short time, which is to be used by the operator in searching a desired scene quickly similarly as the fast forward. Also similarly as the fast forward, as a scheme for realizing the fast reverse, a scheme for raising the data transfer rate and a skip scheme are available.

In the case where the data to be handled cannot be interpreted backwards continuously, a scheme of going back to a playback position from which the interpretation is possible, playbacking for a certain amount, and then shifting the playback position backwards again until a position from which the interpretation is possible is found will be used. In such a case, a method for recording data backwards into the storage device on this data playback device side resembles the scheme for raising the data transfer rate, while a method for searching playbackable data at a backward position using the seek operation resembles the skip scheme.

Here, it is also possible to newly provide a operation mechanism called index based fast forward. Namely, the seek points listed in the playback start index list are sequentially playbacked for a prescribed period of time each automatically, and the operator watching these sequentially playbacked data switches the playback mode to the normal playback at a desired scene (by pressing a playback button) such that it becomes possible to find out the desired scene more quickly than the fast forward. In this index based fast forward, the order of selecting indexes to be playbacked for a prescribed period of time each can be given by the priority order in the list. Else, the indexes belonging to the same contents (having the same data identifier) as the playback start index initially selected by the operator can be selected and sequentially playbacked in some order. Else, the indexes having the recording times nearby the recording time of the index initially selected by the operator can be selected and sequentially playbacked. Else, the indexes having names identical or similar to the index initially selected by the operator can be selected and sequentially playbacked. In this case, the reference count of the index at which the operator switched the playback mode to the normal playback is going to be incremented.

The fast forward, the fast reverse, the index based playback, and the index based fast forward are the operation mechanisms for shifting the playback position forwards/backwards, but besides these, it is also possible to provide an operation mechanism for allowing the operator to specify the playback position explicitly. For example, it is possible to provide operation buttons indicating jump to 10 minutes later and 30 minutes later (or 10 minutes earlier and 30 minutes earlier) from the current playback position, for example, or it is possible to provide an operation mechanism which urges the operator to enter how many minutes later should the playback jump, and jumps the playback position to the specified minutes later. In such a case, this data playback device issues the seek request for a specified jumping target. In this example, when the normal playback is carried out over a prescribed period of time from a certain seek point, that playback start point is to be added to the playback start index list, but that seek point may be added to the playback start index list either unconditionally (using the principle of FIG. 2A), or only when a seek step reaching to that seek point is greater than a prescribed threshold (using the principle of FIG. 2B).

The recording is the operation mechanism for recording the video data or the audio data into the server. As a scheme for realizing the recording, a scheme for preparing data to be recorded at this data playback device side using the encoder and the input unit, and a scheme for preparing data to be recorded at the server side (at a device other than this data playback device) are available.

In the scheme for preparing data at this data playback device side, this data playback device is equipped with devices for providing a source of data to be recorded such as tuner and encoder, and this scheme is used when the server is not equipped with such devices.

When the operation for the data recording is carried out by the operator or the automatic recording by the device is started, the control unit 21 issues a request for the data recording with respect to the server. Then, after waiting for a completion of a preparation for the recording, the control unit 21 issues a request for starting the data encoding to the encoder 28. The encoder 28 inputs data from the input unit 30, encodes them, and transfer them to the control unit 21. The control unit 21 transfers data to be recorded to the server. When the operator carries out the operation for ending the recording, the control unit 21 issues a request for stopping the data encoding to the encoder 28 and stops the data reception. Then, the control unit 21 issues a request for ending the data recording with respect to the server.

The scheme for preparing data at the server side is used when the server is equipped with devices for providing a source of data to be recorded such as tuner and encoder.

When the operation for the data recording is carried out by the operator or the automatic recording by the device is started, this data playback device issues a request for the data recording with respect to the server. Then, the server carries out a preparation for the recording, and records data into a storage device by inputting data from a device that is a data source. When the operator carries out the operation for ending the recording, this data playback device issues a request for ending the data recording with respect to the server. The server stops the input of data from a device that is a data source, and finishes the recording.

When the tuner and the encoder are provided at both the server and this data playback device, either scheme can be used.

The index attaching is an operation in which the operator explicitly adds the playback start index to the index list. The index attaching is used when the operator anticipates the later referring to that playback position.

When the operator carries out the operation for the index attaching, this input is notified to the control unit 21, and the control unit 21 generates the playback start index from the current playback position and adds this to the playback start index list in the storage device 23. In the case where the playback start index having the same value as that playback position as the seek point already exists in the list, the reference count of that playback start index is incremented. Also, for the playback start index which is generated or whose reference count is updated by the index attaching, the protection flag is set up so that this index will not be deleted automatically even when its priority order becomes low. Further details of these processes are similar to the case of automatically detecting the playback start index so that their description is omitted here.

Figure 25:
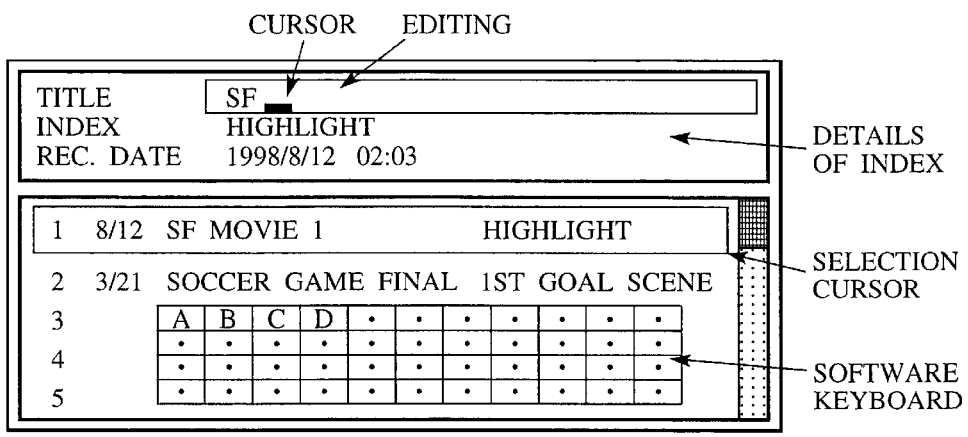
FIG. 25 is a diagram showing an exemplary configuration of an index editing display screen that can be used in the data playback device of FIG. 17.

Next, the user interface to be used at a time of editing the playback start index list will be described. A display screen at a time of the editing is configured as shown in FIG. 25. The editing operations that can be carried out by the operator includes the following.

Renaming of index;

Deletion of index;

Adjustment of a seek point indicated by the playback start index; and

Setting up of a protection flag. In the following, each of these operation mechanisms will be described.

Renaming of index: An operation mechanism for renaming the index from a name of the index that is automatically given by this data playback device for the purpose of making it easier to recognize the index at a time of later referring is provided.

The operator selects a playback start index that is a target of the renaming of index from the list. The operation at a time of selection is similar to the operation at a time of the index based playback so that its description is omitted here.

A new name of the selected playback start index is entered from an input device. The control unit 21 receives input from the user input unit 26, and reflects the operator's input such as cursor movement and the character input into the display screen and the content of the editing target playback start index. When the input operation is finished, the operator carries out the operation for affirming the input and finishes the editing, while the control unit 21 re-register that playback start index into the list. In the case where the index list is recorded in this data playback device, the control unit 21 records the target playback start index into the storage device 23, whereas in the case where the index list is recorded at the server side, the control unit 21 issues a request for the re-registration of the target playback start index with respect to the server through the data input/output unit 22.

Deletion of index: An operation mechanism for allowing the operator to explicitly delete an index that has become unnecessary or that has been registered because of the noise in the automatic detection is provided.

The operator selects a deletion target playback start index from the list. When the operator affirms the selection, the control unit 21 deletes the deletion target playback start index from the list. In the case where the index list is recorded in this data playback device, the control unit deletes the deletion target playback start index from the storage device 23, whereas in the case where the index list is recorded at the server side, the control unit 21 issues a request for the deletion of the deletion target playback start index with respect to the server through the data input/output unit 22.

Seek point adjustment: An operation mechanism for re-specifying a seek point indicated by the index to a more accurate position is provided for the sake of convenience at a time of referring to the automatically registered index later on.

The operator selects a seek point adjustment target index from the list, and changes its seek point appropriately using an input device. The control unit 21 receives input from the user input unit 26, and reflects the operator's input into the display screen and the content of the seek point adjustment target playback start index. When the editing is finished, the operator carries out the operation for affirming the input and finishes the editing. In the case where the index list is recorded in this data playback device, the control unit 21 records the target playback start index into the storage device 23, whereas in the case where the index list is recorded at the server side, the control unit 21 issues a request for the re-registration of the target playback start index with respect to the server through the data input/output unit 22.

Protection flag set up: An operation mechanism for attaching a deletion prohibition attribute to the index is provided in order to prevent the deletion of the index from the storage device when the priority order of the index becomes lower while using this data playback device over an extended period of time.

The operator selects a protection flag set up target index from the list, and sets a protection flag value appropriately using an input device. The control unit 21 receives input from the user input unit 26, and reflects the operator's input into the display screen and the content of the protection flag set up target playback start index. When the editing is finished, the operator carries out the operation for affirming the input and finishes the editing. In the case where the index list is recorded in this data playback device, the control unit 21 records the target playback start index into the storage device 23, whereas in the case where the index list is recorded at the server side, the control unit 21 issues a request for the re-registration of the target playback start index with respect to the server through the data input/output unit 22.

It is also effective to provide an operation mechanism for adjusting the prescribed time for detecting the playback start index in this data playback device. Namely, an operation mechanism for setting up the threshold T0 used at a time of recording the playback start index can be provided. When T0 is set to be large, the number of indexes that are automatically detected as noises can be reduced, but the time required in automatically detecting the index becomes longer. On the contrary, when T0 is set to be small, many indexes can be automatically detected, but the number of indexes that are automatically detected as noises increases.

When the operator carries out the operation to call up a screen for setting the threshold T0, the control unit 21 display the current threshold T0 through the output unit 29. The operator then changes its value using an input device. The control unit 21 receives input from the user input unit 26, and reflects the operator's input into the value of the threshold T0. When the editing is finished, the operator carries out the operation for affirming the input, and the control unit 21 records a value of the new threshold T0 in the storage device 23 of this data playback device.

Next, the second example which is directed to the case in which this data playback device reads and playbacks or writes and records data from an external removable storage medium such as video cassette or DVD will be described. The operation mechanisms to be provided in this data playback device are those for playback/index based playback, stop/pause, fast forward, fast reverse (rewind), index based fast forward, recording, index attaching, etc., similarly as in the first example.

The operation mechanisms for playback/index based playback, stop/pause, fast forward, fast reverse (rewind), index based fast forward, recording, index attaching in this second example are the same as the first example so that their description is omitted here. The different between the data playback device in the second example and the data playback device in the first example is the configuration of the data input/output unit 22 and the playback start index list management method.

Figure 26:
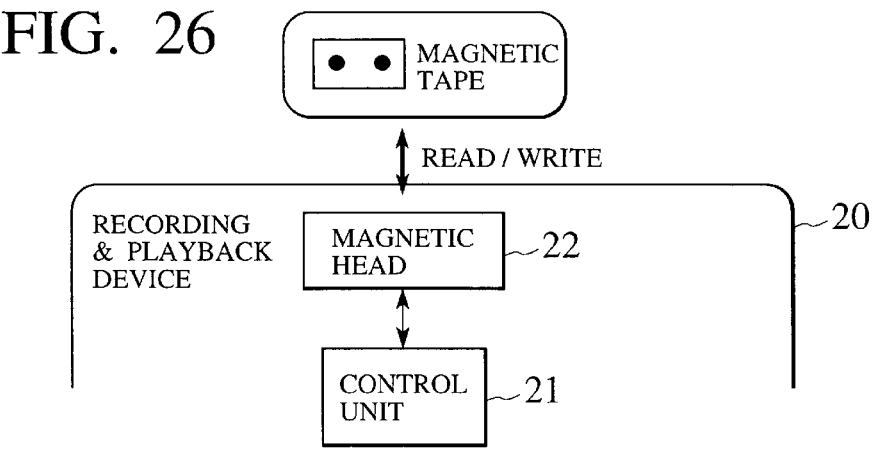
FIG. 26 is a schematic diagram showing an exemplary system configuration for the data playback device of FIG. 17 in the case of playbacking/recording data from an external removable storage medium.

In this example, as shown in FIG. 26, the data input/output unit 22 is formed by a magnetic head or an optical disk pick up for reading data from a separately provided external removable storage medium.

As mentioned above, in the network client type data playback device of the first example, a scheme for recording the index list in a storage device of the server and a scheme for recording the index list in a storage device of the data playback device in correspondence to the data identifier are available. In contrast, in the case of the data playback device of the second example, a scheme for recording the index list in the data playback device and a scheme for recording the index list in a removable storage medium on which data are recorded are available. In either case, an identifier for uniquely identifying the removable storage medium is recorded at a prescribed position on the medium, and the data playback device is made to be capable of reading out that identifier.

The scheme for recording the index list in the storage device of the data playback device is used in the case where the removable storage medium is not writable, or in the case where the data are to be playbacked at a single data playback device alone.

The index information to be recorded into the storage device in this scheme is the same as the information recorded in the data playback device of the first example. Here, an identifier of the removable storage medium given to the removable storage medium is used as the data identifier.

On the other hand, the scheme for recording the index list in the removable storage medium can be used advantageously in the case where the removable storage medium is writable and this removable storage medium is to be used by the other data playback devices as well.

Figure 27A:
FIGS. 27A and 27B are diagrams showing exemplary positions of a playback start index list recording region in an external removable storage medium that can be used in the data playback device of FIG. 17.
Figure 27B:
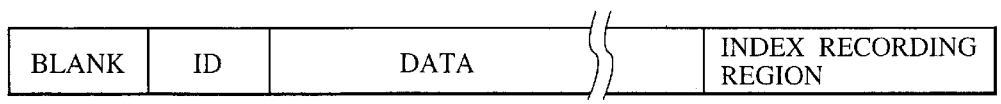

As shown in FIG. 27A or FIG. 27B, an index recording region for recording the indexes is provided at a top portion or a bottom portion of the medium, and the automatically detected indexes and the indexes explicitly attached by the operator are recorded into the index recording region. In the case of using a medium for which seek and access are slow such as tape, it is too slow to carry out reading/writing with respect to the medium at each occasion, so that the caching operation for reading the index recording region from the medium into the temporary memory region in the data playback device when the medium is inserted into the data playback device, and writing the index recording region into the medium at a time of ejecting the medium from the data playback device is carried out.

Note that, in the above, a scheme for automatically generating the playback start index at the client device (the data playback device) using the principle of FIG. 2C has been mainly described, but depending on the type of use or the specification of the data playback device, it is also possible to realize a scheme for recording a point that satisfies the condition of FIG. 2A or FIG. 2B as the playback start index.

As described above, according to the present invention, it becomes possible to leave or prefetch portions that have a high possibility of being random accessed in the cache at a higher priority according a prescribed condition, so that it is possible to reduce the response time when the user commands the playback from arbitrary position in a middle of the contents.

Also, regarding the user's handling at the data playback device, it becomes possible to automatically record scenes that can potentially be the playback start indexed and easily call up the scenes that were recorded in the past, so that the utilization efficiency and the handling of the device can be improved.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data playback device, comprising:

an output unit configured to playback and output either one or both of input audio data and input video data;

a command unit configured to command play, stop, or shifting of a playback position forwards/backwards, to the output unit according to a user input for directly controlling play, stop, or shifting of a playback position forwards/backwards in outputted audio/video data of the output unit:

a memory unit configured to store a plurality of playback start indexes; and a control unit configured to automatically record information during playback regarding a playback position that is determined according to the user input during playback as a playback start index in the memory unit when the user input received by the command unit during playback is in a prescribed pattern for directly controlling the outputted audio/video data of the output unit, and to present the plurality of playback start indexes recorded in the memory unit to a user so as to urge the user to select a desired playback position.

2. The data playback device of claim 1, wherein the control unit records information indicating a position from which playback is started as the playback start index, when the user input selects play continuously over a prescribed period of time.

3. The data playback device of claim 1, further comprising:

an index fast playback unit configured to select selected playback start indexes from the plurality of playback start indexes recorded in the memory unit and to supply the selected playback start indexes to the output unit in a prescribed order, such that the output unit automatically playbacks and outputs either one or both of the input audio data and the input video data in units of a prescribed period of time starting from a seek point contained in the playback start indexes.

4. The data playback device of claim 1, further comprising:

a selection unit configured to enable the user to select deletion target playback start indexes by presenting the plurality of playback start indexes recorded in the memory unit; and a deletion unit configured to delete the deletion target playback start indexes selected at the selection unit from the memory unit.

5. The data playback device of claim 1, wherein either one or both of the input audio data and the input video data are inputted from a removable external memory medium, and the data playback device further comprises:

a writing unit configured to write the plurality of playback start indexes recorded in the memory unit into the removable external memory medium at a time of ejecting the removable external memory medium.

6. A method for controlling playback and output of either one or both of input audio data and input video data according to a user input for directly controlling play, stop, or shifting of a playback position forwards/backwards in outputted audio/video data, the method comprising the steps of:

recording a plurality of playback start indexes during playback, each playback start index being information regarding a playback position that is determined according to the user input during playback, the information being automatically recorded when the user input during playback is in a prescribed pattern for directly controlling the outputted audio/video data:

presenting the plurality of playback start indexes recorded by the recording step to a user so as to urge the user to select a desired playback position; and starting playback from the desired playback start position selected by the user using the plurality of playback start indexes presented by the presenting step.

7. The method of claim 6, wherein the recording step records information indicating a position from which playback is started as the playback start index, when the user input selects play continuously over a prescribed period of time.

* * * * *